US012282130B2

(12) United States Patent
Steel et al.

(10) Patent No.: US 12,282,130 B2
(45) Date of Patent: Apr. 22, 2025

(54) SYSTEMS AND METHODS FOR ISOLATION DETECTION USING A SYMMETRY INVARIANT LOG

(71) Applicants: PIPELINES 2 DATA (P2D) LIMITED, Aberdeen (GB); ConocoPhillips Company, Houston, TX (US)

(72) Inventors: Geoff Steel, Aberdeen (GB); Mark Walsh, Aberdeen (GB); Stephen John Mayo, Aberdeen (GB)

(73) Assignees: PIPELINES 2 DATA (P2D) LIMITED, Aberdeen (GB); ConocoPhillips, Houston, TX (US)

( * ) Notice: Subject to any disclaimer, the term of this patent is extended or adjusted under 35 U.S.C. 154(b) by 0 days.

(21) Appl. No.: 18/215,229

(22) Filed: Jun. 28, 2023

(65) Prior Publication Data

US 2023/0417942 A1 Dec. 28, 2023

Related U.S. Application Data

(60) Provisional application No. 63/356,339, filed on Jun. 28, 2022.

(51) Int. Cl.
*G01V 1/50* (2006.01)
*G01V 1/52* (2006.01)

(52) U.S. Cl.
CPC .............. *G01V 1/50* (2013.01); *G01V 1/52* (2013.01); *G01V 2001/526* (2013.01); *G01V 2210/43* (2013.01); *G01V 2210/6226* (2013.01)

(58) Field of Classification Search
CPC ...... G01V 1/50; G01V 1/52; G01V 2001/526; G01V 2210/43; G01V 2210/6226
See application file for complete search history.

(56) References Cited

U.S. PATENT DOCUMENTS 4,661,933 A * 4/1987 Seeman ................. G01B 17/00
367/27
11,802,985 B2 * 10/2023 Tian ......................... G06N 7/01
(Continued)

OTHER PUBLICATIONS

International Search Report and the Written Opinion of the International Searching Authority for International Application No. PCT/US 23/26386 dated Sep. 22, 2023 (9 pages).

*Primary Examiner* — Amine Benlagsir
(74) *Attorney, Agent, or Firm* — Polsinelli PC

(57) ABSTRACT

Aspects of the present disclosure relate generally to analyzing subterranean cylindrical structures using acoustic sensing. On example includes: sending first acoustic waves in the wellbore via a radial acoustic sensor; receiving first reflection waves associated with the first acoustic waves via the radial acoustic sensor; sending second acoustic waves in the wellbore via the radial acoustic sensor; receiving second reflection waves associated with the second acoustic waves via the radial acoustic sensor; processing recorded data associated with the first acoustic waves, the first reflection waves, the second acoustic waves, and the second reflection waves, wherein the first acoustic waves are associated with a first radial direction, and wherein the second acoustic waves are associated with a second radial direction, the second radial direction being opposite the first radial direction; and generating a plot for identification of one or more isolation regions in the wellbore based on the processing.

18 Claims, 34 Drawing Sheets

(56) References Cited

U.S. PATENT DOCUMENTS

2015/0198030 A1\* 7/2015 Tello ................ E21B 47/005
                                                                    367/86
2021/0123339 A1\* 4/2021 Steel ................ E21B 47/085

\* cited by examiner

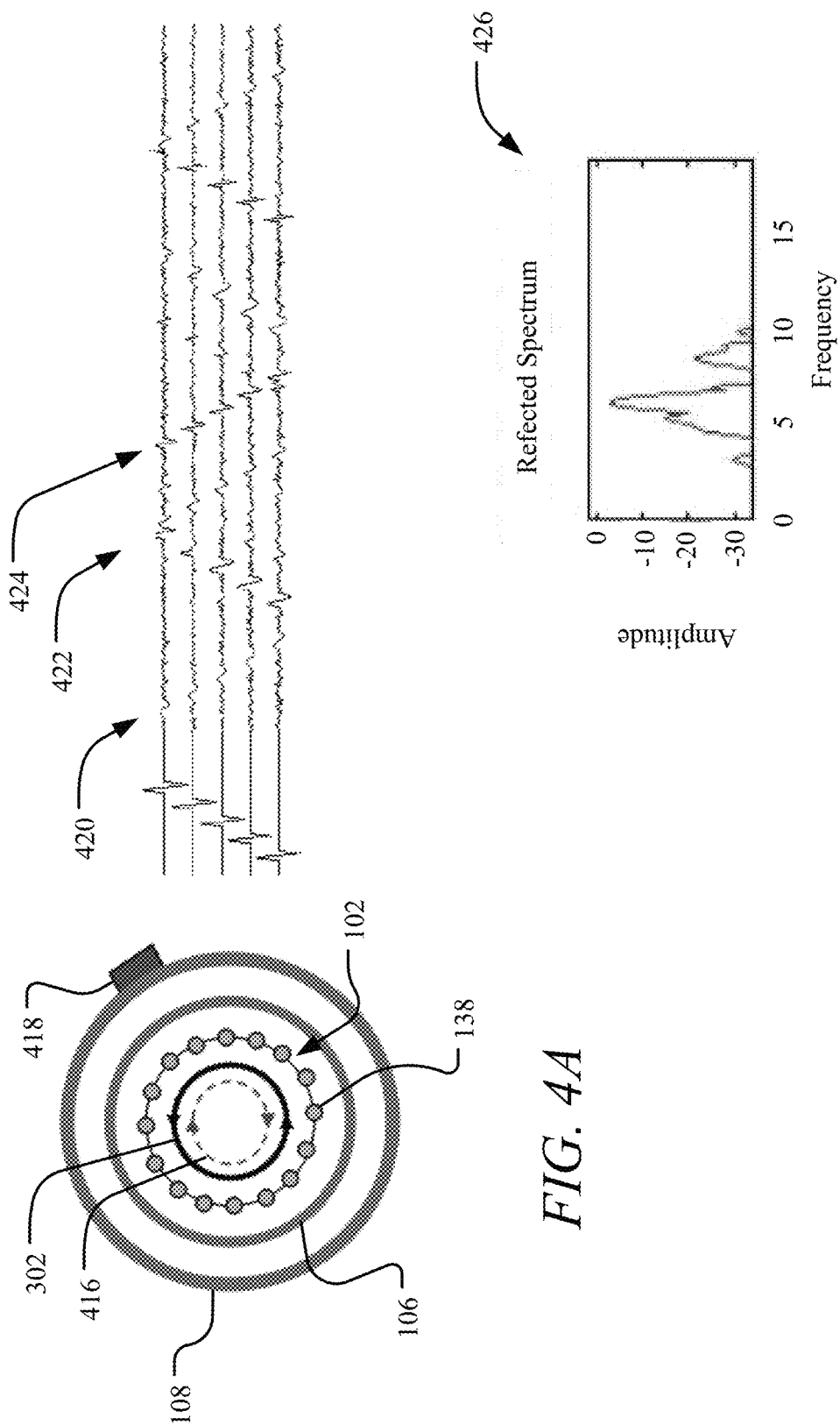

SYSTEMS AND METHODS FOR ISOLATION DETECTION USING A SYMMETRY INVARIANT LOG

CROSS-REFERENCE TO RELATED APPLICATIONS

The present application claims priority to U.S. Provisional Patent Application No. 63/356,339 filed on Jun. 28, 2022, which is incorporated by reference in its entirety herein.

FIELD

Aspects of the present disclosure relate generally to systems and methods for analyzing subterranean cylindrical structures using acoustic sensing and more particularly to identifying isolation in connection with wellbore plug and abandon operations using symmetry invariant techniques.

BACKGROUND

Production of hydrocarbons involves forming one or more wells in a subterranean formation. Generally, in connection with formation of a well, a wellbore is drilled and a casing is passed down the wellbore. The casing often includes sections with differing diameters, eccentricities, and/or bonding with surrounding material. In some regions, there may be concentric casing. In many instances, a casing or outer casing forms an annular space with surrounding rock. The annular space is commonly filled with cement or a similar material over at least part of its length when the well is created. Production tubing is passed through the casing, and the hydrocarbons are produced through the production tubing. In this context, the casing supports the wellbore and prevents collapse of the well.

Wellbores may be plugged and abandoned at the end of the wellbore useful life to prevent environmental contamination, among other benefits. At the end of the useful life, a wellbore commonly includes cemented casing with the production tube passed down the casing. In connection with plug and abandon, an effective seal is created across a full diameter of the wellbore. Conventionally, production tubing is removed and casing is milled away, along with cement exterior to the casing, before setting a continuous new cement plug across the full diameter of the wellbore, from rock to rock. Alternatively, the casing can be left in place, provided that the quality of original cement and cement bond to the exterior of the casing are confirmed. If the cement and cement bond to the exterior of the casing is adequate, a new cement plug can be set inside the casing, thereby effectively creating a barrier across the full diameter of the wellbore.

Thousands of meters of production tubing are typically removed to identify isolation corresponding to regions of cement having seal integrity suitable for plug and abandon. Stated differently, identifying one or more locations of isolation provided by exterior cement during plug and abandon activities conventionally involves removal of internal completion to permit logging tools free access to casings. Through-tubing plug and abandonment may theoretically be performed without removing the production tubing, saving considerable expense. The tubing may simply be cut or perforated and cement passed down the tubing and back up the annulus between tubing and casing to form a plug across the full casing diameter. However, this would involve assessment of the cement bond with casing from a location within the production tubing, and conventional techniques are unable to detect an integrity of a cement bond with a casing through the production tubing, casing, and any material, such as water, air, and/or gas. Isolation detection is thus time and resource extensive. It is with these observations in mind, among others, that various aspects of the present disclosure were conceived and developed.

SUMMARY

Implementations described and claimed herein address the foregoing problems by providing systems and methods for characterizing a subterranean structure. In one implementation, a method for isolation detection in a wellbore is provided. The method generally includes: sending first acoustic waves in the wellbore via a radial acoustic sensor; receiving first reflection waves associated with the first acoustic waves via the radial acoustic sensor; sending second acoustic waves in the wellbore via the radial acoustic sensor; receiving second reflection waves associated with the second acoustic waves via the radial acoustic sensor; processing recorded data associated with the first acoustic waves, the first reflection waves, the second acoustic waves, and the second reflection waves, wherein the first acoustic waves are associated with a first radial direction, and wherein the second acoustic waves are associated with a second radial direction, the second radial direction being opposite the first radial direction; and generating a plot for identification of one or more isolation regions in the wellbore based on the processing.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 4A is a cross sectional view of the radial sensor deployed in a well from which radial acoustic signals are received and processed.

FIG. 4B illustrates a plot of a forward spectrum of the radial acoustic signals of FIG. 4A.

DETAILED DESCRIPTION

Figure 1A:
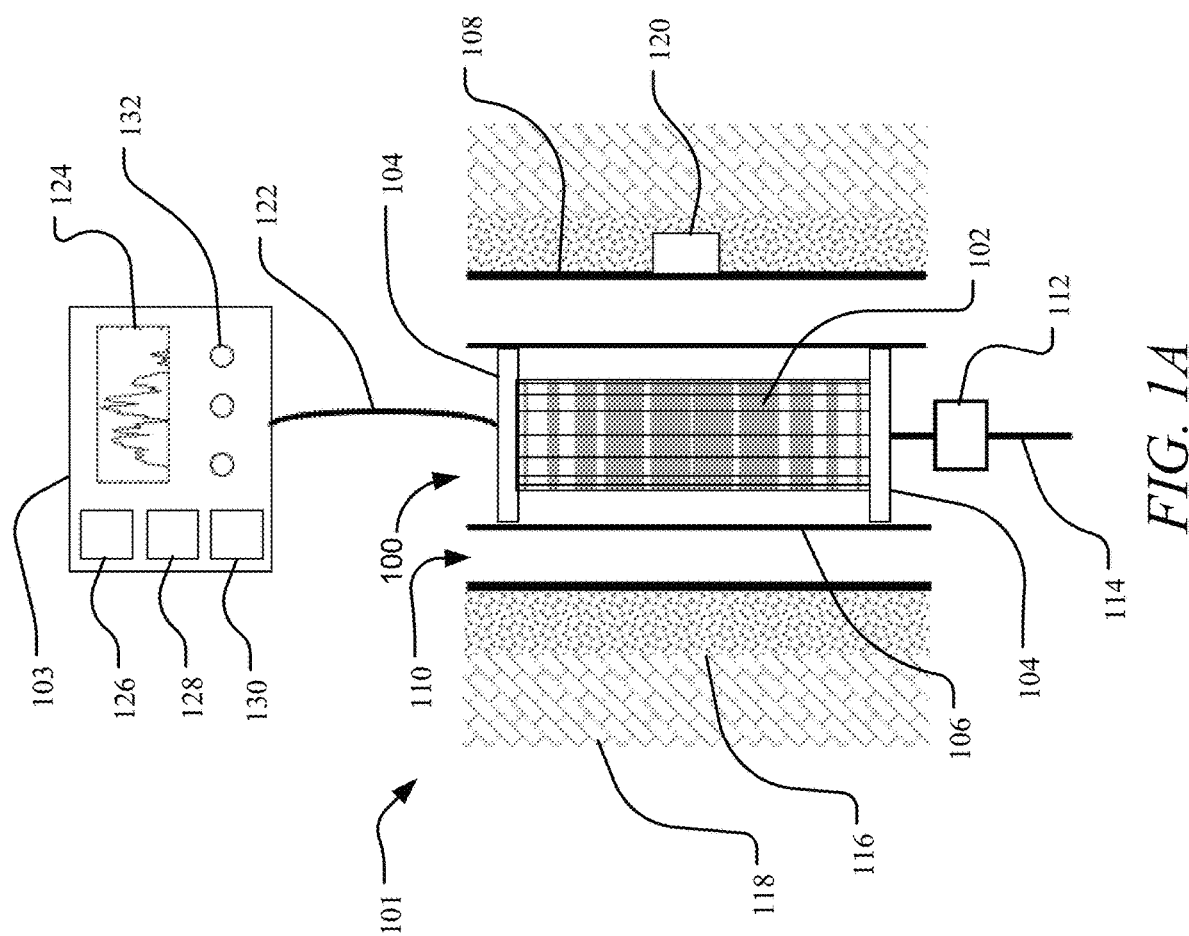
FIGS. 1A, 1B, and 1C illustrate an example radial sensor of the acoustic logging tool deployed in an example downhole environment.

Aspects of the present disclosure involve systems and methods for analyzing a structure, such as a cylindrical structure and/or a subterranean structure, using acoustic waves. In one aspect, an acoustic logging tool having acoustic sensors is deployed in a production tube to detect cement integrity around a casing in a downhole environment of a wellbore. The acoustic sensors may include a radial sensor. The radial sensor located inside the production tube generate a Rayleigh wave traveling around an outer surface of the casing. The wave is reflected from any asymmetries, such as in cement surrounding the casing and/or in the cement bonding with the casing. For example, an air gap adjacent the casing may reflect the wave. By analyzing spectral information from the forward and reflected waves, isolation region(s) may be identified. The isolation region(s) correspond to regions in the wellbore where bonded cement is free from anomalies. Accordingly, the radial sensor provides isolation detection through both the production tube and the casing, without removal of internal completion, thereby reducing the time and resources expended for plug and abandon operations, among other advantages.

In some scenarios, the radial sensor may be positioned in the wellbore at an eccentric position (e.g., not centered in the wellbore). As a result, a reflection of the transmitted acoustic wave may be received due to such eccentricity, even in the absence of asymmetries in the casing or cement surrounding the casing. Certain aspects of the present disclosure provide an isolation detection system that transmits a first acoustic wave and a second acoustic wave. Isolation may be identified based on analysis of reflections for the first and second acoustic waves. For example, the first acoustic wave and the associated reflection, and the second acoustic wave and the associated reflection may be processed based on the first acoustic wave being associated with a first radial direction and the second acoustic wave being associated with a second opposite radial direction, effectively cancelling out (or at least reducing) the effect of the eccentricity associated with the radial sensor, as described in more detail herein.

I. Terminology

In the description, phraseology and terminology are employed for the purpose of description and should not be regarded as limiting. For example, the use of a singular term, such as "a", is not intended as limiting of the number of items. Also, the use of relational terms in the description for clarity in specific reference to the figures are not intended to limit the scope of the present inventive concept or the appended claims. Further, any one of the features of the present inventive concept may be used separately or in combination with any other feature. For example, references to the term "implementation" means that the feature or features being referred to are included in at least one aspect of the presently disclosed technology. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations but is not necessarily included. Thus, the presently disclosed technology may include a variety of combinations and/or integrations of the implementations described herein. Additionally, all aspects of the presently disclosed technology as described herein are not essential for its practice.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture and Operations

Figure 1C:
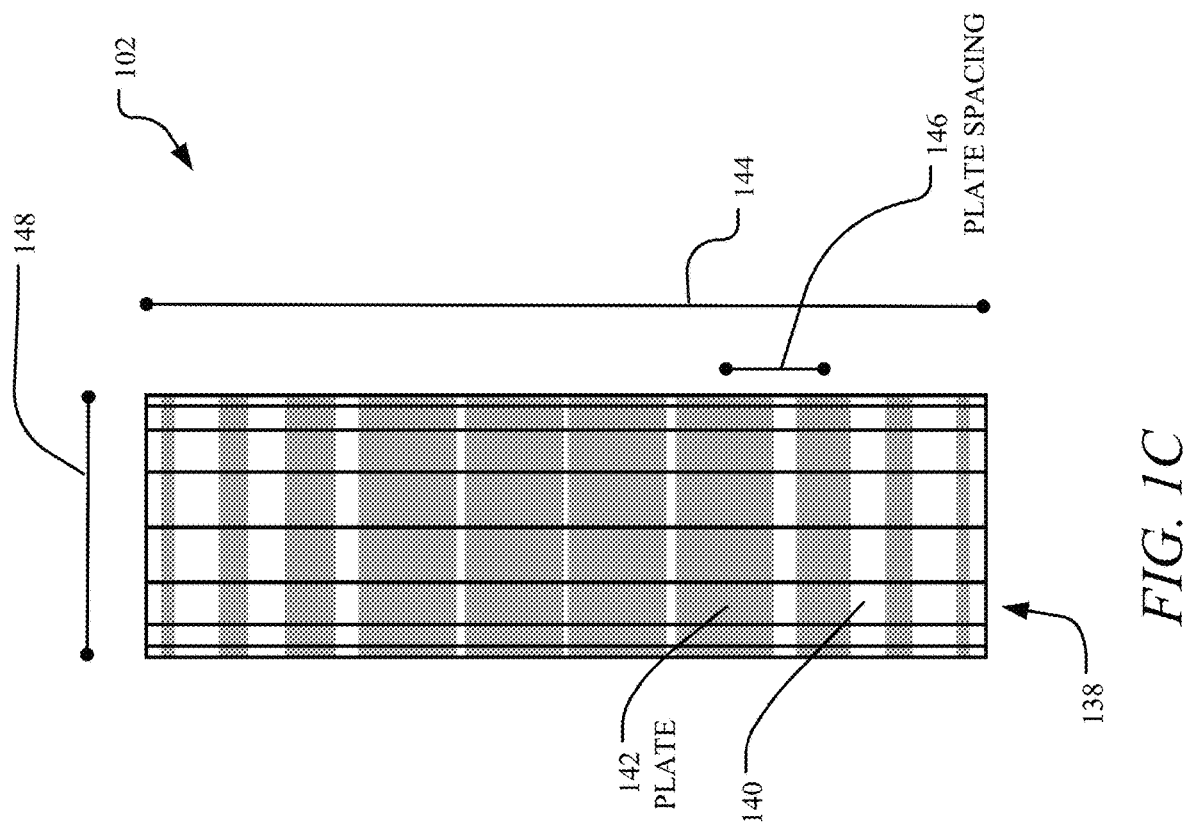
Figure 1B:
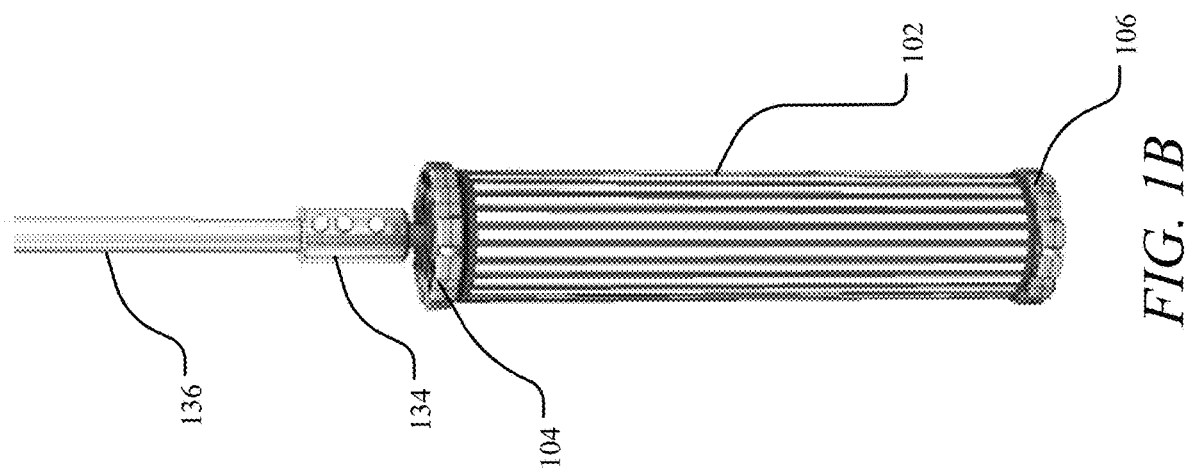

To begin a detailed discussion of an example isolation detection system for characterizing a subterranean structure, reference is made to FIGS. 1A-1B. In one implementation, an acoustic logging tool 100 including one or more acoustic sensors is deployed into the subterranean structure. Examples of the various systems and methods described herein reference the subterranean structure including a production tube and casing in connection with isolation detection for plug and abandon operations. However, it will be appreciated by those skilled in the art that the presently disclosed technology is applicable to various types of structures, systems, and operations, including outside the oil and gas context. For example, the acoustic logging tool 100 may be used to determine a condition of pipes in connection with pigging operations in the oil and gas industry, the water industry, and/or the like. As another example, the acoustic logging tool 100 may be used in oil and gas applications to inspect structures deployed outside of downhole environments. Additionally, the acoustic logging tool 100 may be used to inspect fabricated pipes, storage tanks, and/or cylindrical structures to determine an integrity of structure containment and/or identify materials and connections outside and/or inside the structures.

As can be understood from FIG. 1A, in one implementation, the acoustic logging tool 100 includes a radial sensor 102. The casing or an outer casing forms an annular space with a surrounding subterranean formation of a well. The annular space may be filled with cement or a similar material over at least part of its length when the well is created, and upon filling, the cement is intended to bond with the casing or outer casing to provide a seal.

The radial sensor 102 provides an approximate measure of acoustic impedance of the material surrounding the casing, which may be used in cement classification. Via the radial sensor 102, a characterization of isolation may be generated, as described in more detail herein.

In one implementation, the acoustic logging tool 100 is deployed along the length of the production tube as the radial sensor 102 scans. In one example implementation, the acoustic logging tool 100 is deployed to evaluate isolation between the casing and subterranean formation, such as bedrock, around a hole from inside the production tube.

As discussed above, the acoustic logging tool 100 tolerates eccentricity using the radial sensor 102. Downhole, the production tube is often eccentric with the casing. The radial log may be sensitive to the production tube eccentricity. Certain aspects provide techniques for cancelling effects caused by eccentricity, providing more accurate measurement results as compared to conventional implementations.

As shown in FIGS. 1A-1B, the radial sensor 102 may be deployed in a downhole environment 101. As shown in FIG. 1A, in one implementation, a controller 103 obtains data from the radial sensor 102 in the downhole environment 101. The radial sensor 102 may record signals using a recorder integrated with the acoustic logging tool 100 and/or transmit the signals up wires for recording at the surface. Once the data is recorded, the controller 103 obtains the data for processing.

In one implementation, the radial sensor 102 includes a body, which may be cylindrical in shape and made from electrically insulating material with staves arranged on an outer surface of the body. The radial sensor 102 may be maintained in a centralized, coaxial position inside a length of a production tube 106 using one or more spacers 104. The spacers 104 may be made from electrically insulating material and disposed at a proximal end and a distal end of the radial sensor 102. The production tube 106 may be made from steel or a similar metal and is vertically oriented and disposed coaxially within a length of casing 108. The casing 108 may similarly made from steel and/or the like. Between the casing 108 and the production tube 106 is an annular gap 110, which may be filled with water. Surrounding the casing 108 is a layer of cement 116, which is further surrounded by a subterranean formation 118. The subterranean formation 118 may include various types of rocks disposed about the wellbore. In some cases, an anomaly 120 may be present in the cement 116, such that there is no isolation at the region including the anomaly 120.

The radial sensor 102 is movable axially within the production tube 106. In one implementation, the radial sensor 102 is connected at the distal end to a shaft 114 that is engaged to an advancing system 112 having a motor to advance and retract the radial sensor 102 downhole. It will be appreciated, however, that the radial sensor 102 may be translated along a length of the production tube 106 in various manners.

As described in more detail herein, the controller 103 obtains data captured using the acoustic logging tool 100, including the radial sensor 102, and processes the recorded data. The radial sensor 102 transmits waves and captures the reflection of the waves. The radial sensor 102 may record the reflected wave and provide a signal representing the reflected wave to a computing device, such as the controller 103, at the surface for recording. In either case, the controller 103 may obtain the recorded data that is captured using the radial sensor 102 directly or indirectly. The recorded data may be communicated to the controller 103 from the radial sensor 102 or via another computing device and/or data storage device using a wireless connection (e.g., for communication over a network) or a wired connection (e.g., wired connection 122).

In some implementations, the controller 103 or another computing device may include a display 124, at least one power source 126, at least one processor 128, a signal generator 130, controls 132, and/or the like for controlling the radial sensor 102, recording signal data, displaying signal data, and/or processing the signal data as described herein. The controller 103 may be present on-site or remote from the downhole environment 101. It will further be appreciated that the same or separate computing devices may be used to control the radial sensor 102 in connection with capturing and recording signals and to process the captured signals. The example implementations described herein will reference the controller 103 in connection with processing the recorded signals. However, this reference is for discussion purposes only and is not intended to be limiting.

Referring to FIGS. 1B-1C, the radial sensor 102 may be mounted to a bar 136 (e.g., a made from ploy methyl methacrylate, acrylic, acrylic glass, etc.) using a coupling 134 and disposed between the spacers 104 and translated within the production tube 106. In one implementation, the radial sensor 102 includes a plurality of staves 138 disposed about the body of the radial sensor 102. The example implementations discussed herein reference the staves 138 including sixteen staves. However, it will be appreciated that any number of the staves 138 may be used for spatial sampling depending on a size of the radial sensor 102, the production tube 106, the casing 108, and/or the like.

In one implementation, the radial sensor 102 includes a plurality of plates 142 arranged on a backing 140. The backing 140 may be made from a high-impedance material, such as an epoxy-tungsten mix. Each of the plates 142 is a sensitive plate configured to transmit and receive signals. While separate plates may be used for transmitting and receiving, utilizing the plates 142 for both transmitting and receiving reduces an overall size of the radial sensor 102, thereby conserving resources and increasing mobility while maintaining sensitivity.

As can be understood from FIGS. 1B-1C, each of the staves 138 extends along a longitudinal line formed by a plurality of the plates 142 (e.g., ten plates) wired in parallel and operating at frequencies well below resonance. The plates 142 taper in size longitudinally along a length of the radial sensor 102, such that the plates 142 are longer in a middle of the radial sensor 102 and shorter at ends of the radial sensor 102. This tapering configuration of the plates 142 forms a truncated hanning window to minimize longitudinal sensitivity of the radial sensor 102. Stated differently, the tapering configuration provides that the radial sensor 102 is sensitive to waves traveling around the production tube 106 and the casing 108 but not to waves traveling axially along the lengths of the production tube 106 and the casing 108. Dimensions of the plates 142 may vary based on the hanning window or other weighting function utilized to form the tapering configuration. For example, each of the plates 142 may be approximately 2 mm thick, 10 mm wide, and include a spacing 146 from a center of one plate to another plate of approximately 44 mm. The radial sensor 102 may have a width 148 of approximately 86 mm, a length 144 of approximately 420 mm, and the bar 136 may be approximately 25 mm wide in this example.

Each of the staves 138 acts as both a transmitter and receiver. In one implementation, the radial sensor 102 transmits on one of the staves 138 at a time, while receiving each time at all the staves 138. Stated differently, a first stave of the staves 138 is pinged and transmits a first signal, which is recorded on each of the staves 138. Then a second stave of the staves 138 is pinged and transmits a second signal, which is recorded on each of the staves 138. Each of the staves 138 transmits in turn while all the staves 138 record.

Figure 2:
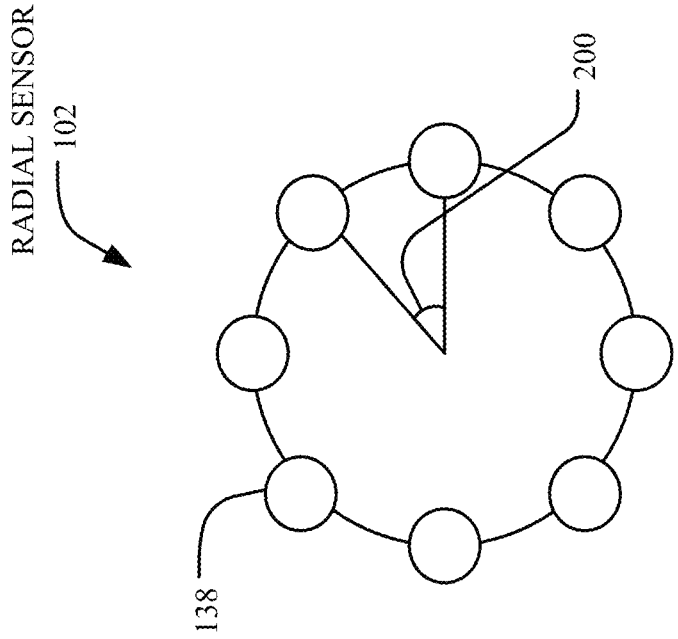
FIG. 2 shows an example radial sensor with multiple staves.

Referring to FIG. 2, an example radial forward wave (e.g., also referred to herein as endfire) sensing configuration is illustrated. In one implementation, the staves 138 are disposed about an axis of the radial sensor 102 with equidistant spacing. For example, the staves 138 may each be spaced from each other by an angle 200. When a wave is transmitted by one of the staves 138, the wave travels around the casing 108 in a first direction (e.g., clockwise). When the anomaly 120, such as a channel, is not present in the cement 116, the wave will continue to travel around the casing 108 without interruption. When the anomaly 120 is present, the anomaly 120 reflects the wave. Accordingly, as described in more detail herein, the radial sensor 102 identifies the anomaly 120 based on the reflected wave.

Figures 3A, 3B:
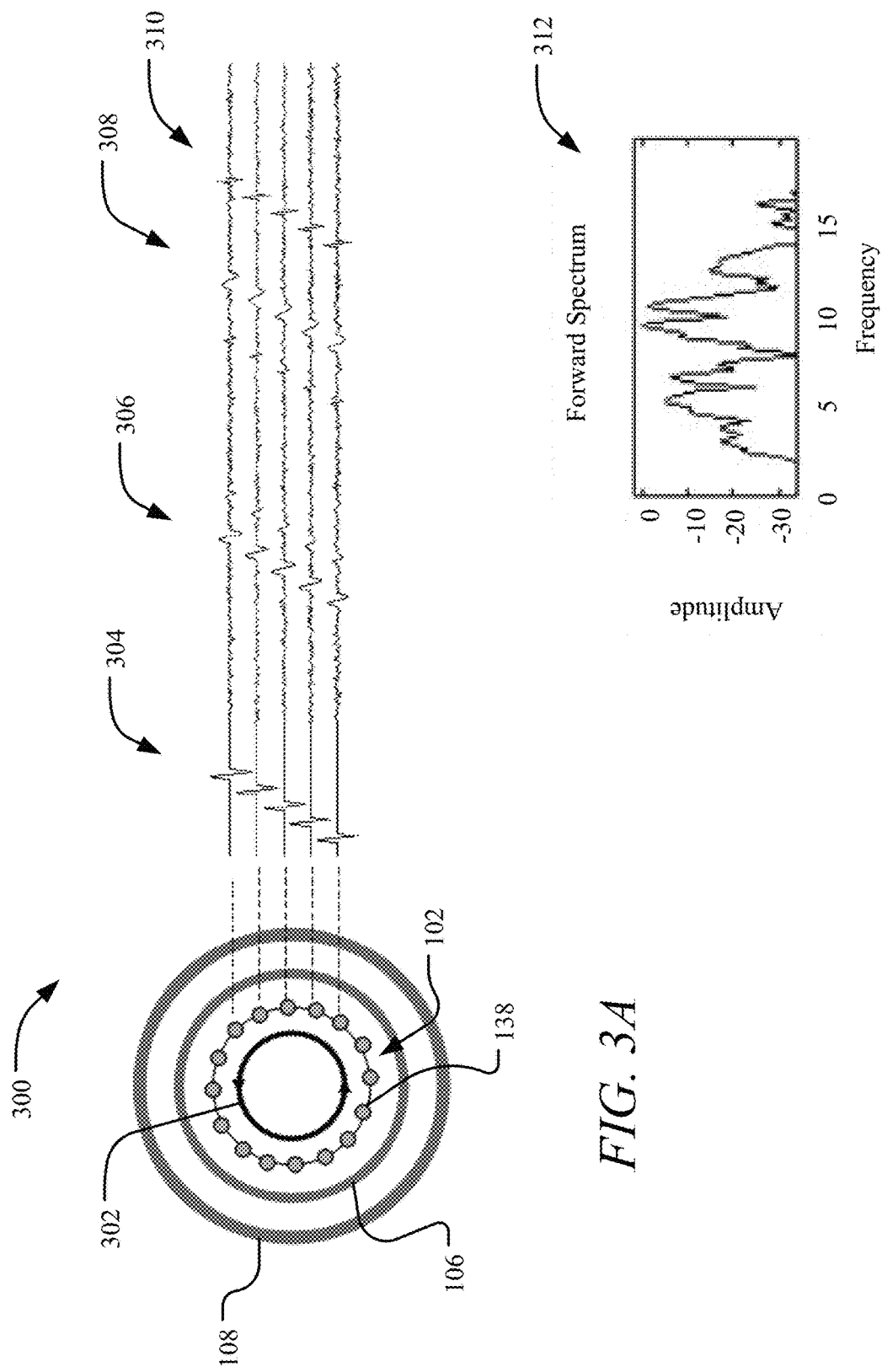
FIGS. 3A and 3B show an example radial forward wave sensing configuration of an isolation detection system.

To begin a detailed discussion of a time delay method for radial sensing, reference is made to FIGS. 3A-3B, which illustrate a representation 300 of radial sensing in the absence of a target. FIG. 3A shows a representation of a timing sequence of part of a transmit and receive sequence. In one implementation, a forward wave 302 is transmitted with time delays to define an angular velocity. More particularly, a pulse, such as a chirp pulse is emitted from each stave 138 and received by all of the staves 138. Stated differently, the staves 138 each capture signals from the transmitted pulse as it propagates around the casing 108. After a receiving time period during which the staves 138 capture signals from the transmitted pulse following transmission, another of the staves 138 is excited, followed by the receiving time period until each of the staves 138 has transmitted.

The forward wave 302 may be formed by firing one of the staves 138, listening on all of the staves 138, firing another of the staves 138 and listening again of all of the staves 138, and so on until each of the staves 138 has transmitted. During processing the captured signals are added together as described herein. In either case, during processing the received signals are shifted in time to remove the time interval between the transmitted pulses. The forward wave 302 may be sensed at one or more axial positions along the production tube 106 as the radial sensor 102 is moved.

The received signals may be filtered to provide the same time delays. For illustration purposes, traces from five of the staves 138 are shown with time on a horizontal axis and signal on a vertical axis for each trace. As shown, the traces are arranged on the same time axis and displaced from each other on the vertical axis to highlight the relative timing of the pulses 304. The uniform time interval between transmission of the pulses 304 means that the pulses are arranged on a notional line with a positive gradient. The radial sensor 102 provides a dispersive system in which the velocity of acoustic waves change depending on its frequency. Transmission of the pulses 304 comprising multiple frequencies results in the forward wave 302, whose frequency components are separated in time.

Accordingly, the forward wave 302 has an overall pattern that is generally the same for each of the staves 138 in the absence of asymmetry due to the presence of any anomalies. The overall pattern of the forward wave 302 is offset by the same time intervals between the staves 138 as the transmitted pulses 304. Thus, the received signals may be filtered to provide the same time delays. Distinctive peaks in the traces (e.g., peaks 306, 308, and 310) are thus arranged on notational lines having approximately the same positive gradient as the pulses 304. The forward signals including the peaks 306, 308, and 310 may be combined together and converted from the time domain to the frequency domain to provide a forward spectrum, as illustrated in a plot 312 shown in FIG. 3B. The signals may be converted from the time domain to the frequency domain using a Fourier transform or similar transform.

In other words, the forward wave 302 has a spectrum of frequencies returned at different times. The pulses 304 are transmitted to generate Rayleigh waves traveling around the casing 108. As described in more detail herein, the Rayleigh waves may be formed when the forward wave 302 has a wavenumber distributed around the circumference of the radial sensor 102 for a frequency at a center of a range of interest. The received signals from the forward wave 302 at each stave 138 over a period of time are processed to remove the time interval and summed and transformed into the forward spectrum. As shown in the example plot 312, certain frequencies in the forward wave 302 may be strong with a relatively large amplitude, for example approximately 5-7 kHz, 9-11 kHz, etc.

Turning to FIGS. 4A-4B, an asymmetric feature 418 is present outside the casing 108, which may be the anomaly 120. The forward wave 302 interacts with the asymmetric feature 418 to create a reflected wave 416. The reflected wave 416 travels in a direction opposite to the forward wave 302. In the example shown in FIG. 4A, the reflected wave 416 travels in the clockwise direction. Accordingly, the reflected wave 416 is received by the staves 138 in a reverse order from the transmission of the forward wave 302. Thus, signals from the reflected wave 416 is superimposed in the traces. Distinctive peaks (e.g., peaks 420, 422, and 424) corresponding to the reflected wave 416 are disposed on notational lines with a negative gradient. As such, the forward wave 302 may be distinguished from the reflected wave 416. The reflected signals including the peaks 420, 422, and 424 may be combined together and converted from the time domain to the frequency domain to provide a reflected spectrum, as illustrated in a plot 426 shown in FIG. 4B. The signals may be converted from the time domain to the frequency domain using a Fourier transform or similar transform.

Figure 4C:
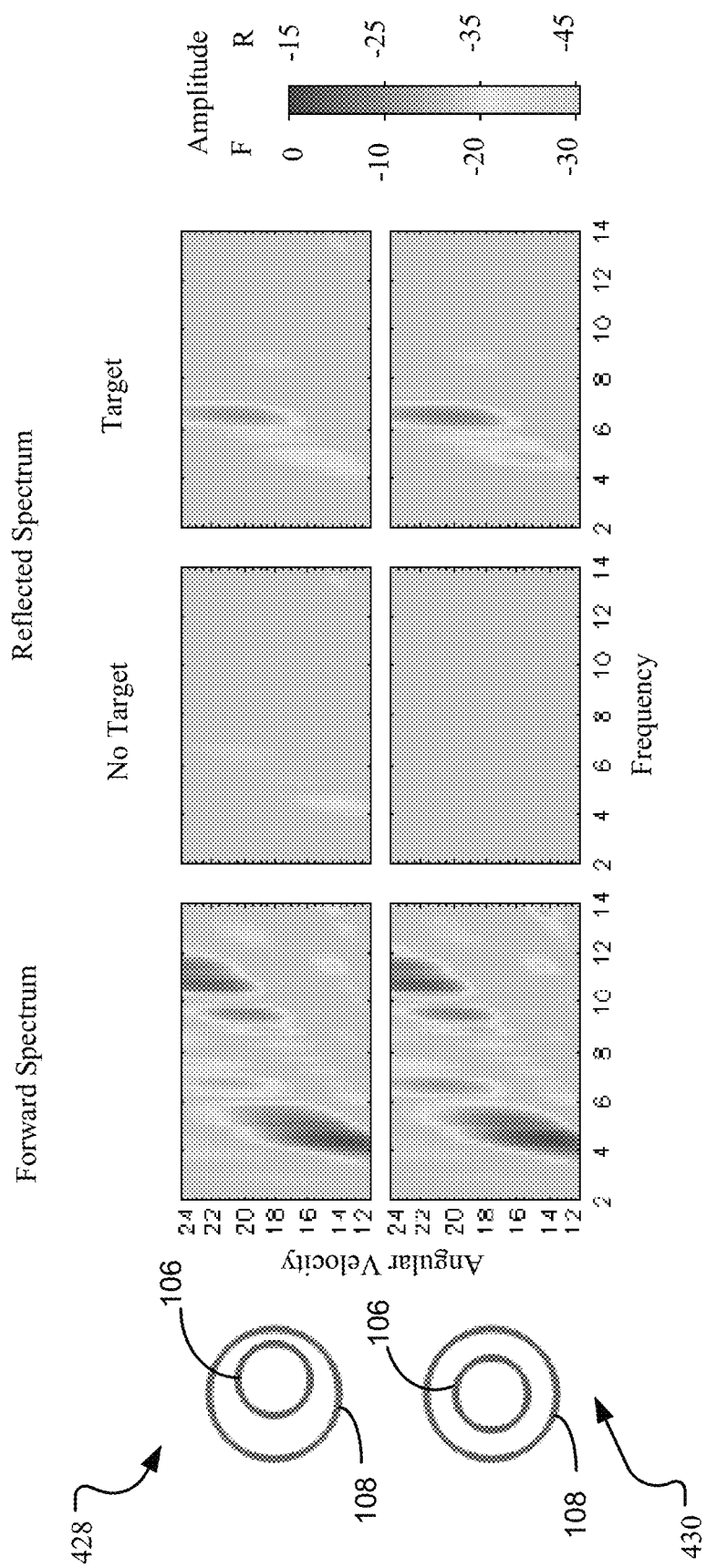
FIG. 4C illustrates a comparison of an effect of eccentricity on the forward and reflected spectra.

FIG. 4C illustrates a comparison of an effect of eccentricity on the forward and reflected spectra. Results for an eccentric configuration 428 of the production tube 106 within the casing 108 is compared with results for a concentric configuration 430 of the production tube 106 within the casing 108. The results for each of the configurations includes plots of the forward spectrum, as well as plots of the reflected spectrum where the asymmetrical feature 418 is included (labeled as "Target") and not included (labeled as "No Target"). Each of the plots includes angular velocity on the vertical axis and frequency on the horizontal axis with amplitude being depicted on a color intensity scale.

It will be understood that the production tube 106 generally always provides some form of eccentricity within the casing 108. For example, the production tube 106 may be resting against one side of an inner surface of the casing 108, such as in an inclined well, or an axis of the production tube 106 may be at an angle relative to the casing 108. This is particularly true since spacers are often not used to maintain the production tube 106 in the concentric configuration 430, wells are rarely truly vertical, and/or the like. As shown in FIG. 3A, the transmitted pulses 304 of the forward wave 302 are chirps with a range of frequencies. The forward wave 302 is the result of interaction of the transmitted pulses 304 with material surrounding the casing 108 and includes a spectrum of frequencies at different amplitudes. Stronger amplitudes are shown by darker areas in red. In the example of FIG. 4C, the forward wave 302 has strong amplitude components at approximately 4-5 kHz and at approximately 11 kHz over a range of angular velocities. Thus, the forward spectrum for both configurations 428 and 430 contains many modes that propagate at different frequencies and angular velocities, which is characteristic of a dispersive system.

The reflected spectrum of the reflected wave 416 is shown for each of the configurations 428 and 430. Where there is no target (no asymmetric features), the reflected wave 416 and thus the reflected spectrum is minimal (with only weak signals present, if any), as the forward wave 302 encounters no features that reflect the forward wave 302 sufficient to form the reflected wave 416. Where the asymmetric feature 418 is present, the different acoustic impedance of the asymmetric feature 418 relative to the cement 116 forms the reflected wave 416 with different frequencies and amplitudes depending on the angular velocity of the forward wave 302 and the reflected wave 416. In the example of FIG. 4C, only one mode reflects from the asymmetric feature 418, with the mode having a large displacement on the surface of the casing 108. This strong reflection is received at approximately 6-7 kHz when the angular velocity is approximately 17 and 24 krad/s.

As can be understood from FIG. 4C, the forward spectrum for both the eccentric configuration 428 and the concentric configuration 430 are generally the same. However, reflection are detected for the concentric configuration 430 even when the asymmetrical feature 418 is not present.

Figure 5A:
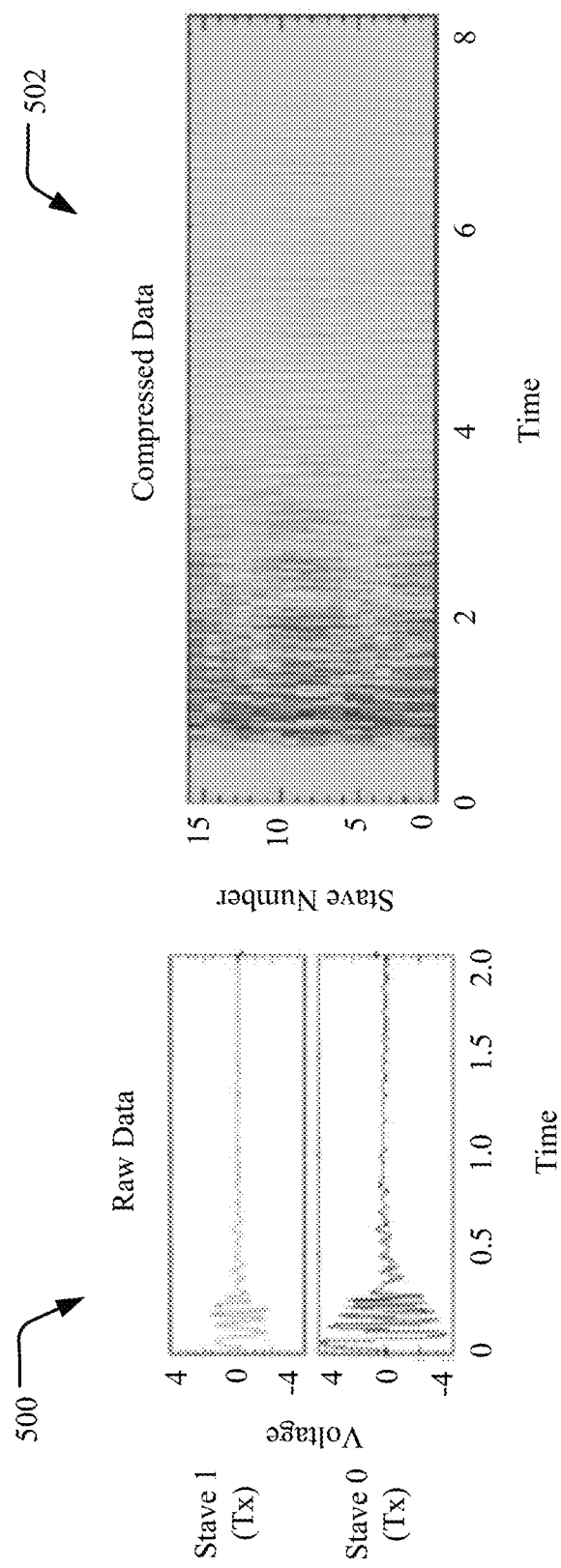
FIG. 5A shows raw data and compressed data for recorded waveforms during a transmission of the radial sensor.

To begin detailed description of the reconstruction method, reference is made to FIGS. 5A-5D. Turning first to FIG. 5A, recorded waveforms from a single transmission of one of the staves 138 is shown. In one implementation, a data recorder, for example integrated with or in communication with the controller 103, utilizes dedicated electronics to record the signals as raw data 500 at a wide bandwidth. For example, the data recorder may be set to 10,000 points at 1 µs per point (1 MS/s). The raw data 500 may be compressed into compressed data 502 and saved. Every transmission produces a dataset containing receiving waveforms for each of the staves 138. In the example described herein where there are sixteen of the staves 238, each transmission would produce sixteen receiving waveforms. The raw data 500 may be saved, for example, at every fourth point giving 2500 points at 4 µs sampling.

Each of the staves 138 may be numbered (e.g., 0-15). In the example shown in FIG. 5A, Stave 0 was the transmitting stave. The raw data 500 shows the output of Stave 0, as well as adjacent Stave 1. During a first period (e.g., approximately 300 µs), Stave 0 approximates zero voltage due to the short to ground. As shown in the raw data 500, voltage across the resistance, amplified by approximately +30 dB, shows a chirp of approximately +/−4V. Stave 1 also shows a similar chirp due to electrical pickup from the transmitting voltage as a result of the wires having a close proximity. The raw data 500 may be four times oversampled to focus on frequencies up to approximately 30 KHz as frequencies of interest. The oversampling of the raw data 500 improves signal-to-noise ratio. The raw data 500 is saved as the compressed data 502 for all of the staves 138 receiving the signal (e.g., Staves 0-15). The colors shown in the compressed data 502 have a logarithmic scale and show decay to −40 dB by approximately 7 ms. To generate the compressed data 502 from the raw data 500, data corresponding to an initial time period (e.g., the initial 500 µs) was blanked to zero to remove the transmission pulse, and the waveforms were band-limited to the frequencies of interest (e.g., band-limited to 30 kHz), and the waveforms were saved at every fourth point giving 512 points at 16 µs sampling.

Turning to FIGS. 5B-5E, the compressed data 502 is processed to obtain forward and reflected waves. As described herein, each of the staves 138 acts as a transmitter in transmitting a signal, and for each transmission by one of the staves 138, all of the staves 138 record the signal. A single measurement by the radial sensor 102 consists of the data recorded for all of the transmissions by the staves 138. For example, when one of the sixteen staves transmits, all sixteen staves record the transmission, and one measurement consists of sixteen transmissions, one on each stave. The single measurement is converted into a single result, as illustrated with FIGS. 5A-5E.

Figure 5B:
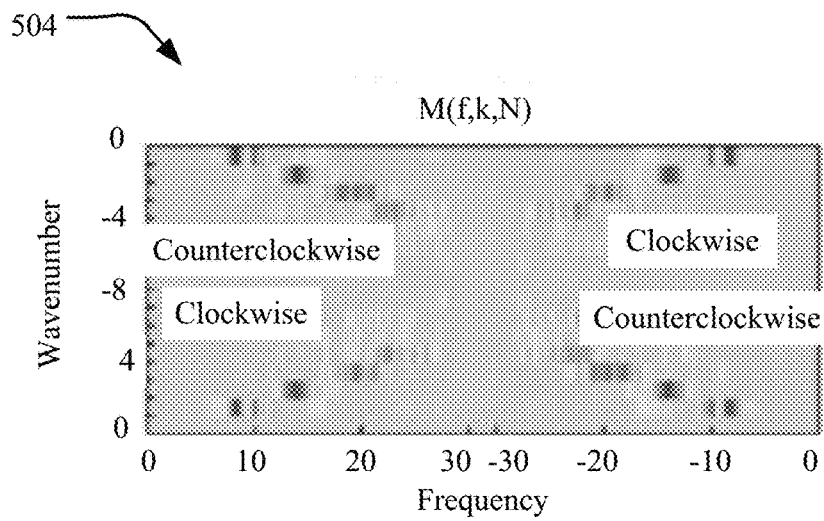
FIG. 5B illustrates the recorded waveforms separated into clockwise waves and counterclockwise waves following conversion to the frequency domain using a Fourier transform.

Generally, recorded waves are separated, shifted, and combined to obtain forward and reflected waves. Separation of the recorded waves in the compressed data 502 is illustrated in FIG. 5B. Separation of the waves is impractical in the time domain due to the radial sensor 102 creating a dispersive system with different frequencies traveling at different velocities. The radial sensor 102 includes the staves 138 arranged radially, such that the signal is traveling in both a first direction and a second direction, opposite the first direction, around the radial sensor 102 and that the signal completes itself arriving back at the transmission location. Accordingly, unlike the linear array, separation of the signals in the time domain is impractical.

In one implementation, the recorded waves in the compressed data 502 are converted to the frequency domain using a Fourier transform. Referring to FIG. 5B, the compressed data 502 as a single transmission in time and frequency for all of the staves 138 (e.g., transmission by one stave recorded on all sixteen staves). The single transmission of the compressed data 502 may be taken as an Nth transmission and is a function of time and angle, which may be described as m(t,θ,N). FIG. 5B illustrates separated waves 504 resulting from the Fourier transform of the compressed data 502. The Fourier transform is a function of frequency and wavenumber, which may be described as M(f,k,N), as complex quantity of which only the amplitude is shown.

More particularly, the Fourier transform decomposes the compressed data 502 into its constituent frequencies. Stated differently, the Fourier transform of the compressed data 502, which is a function of time, is a complex-valued function of frequency that provides wavenumbers corresponding to how many waves fit around the casing 108. For example, in the implementation having sixteen of the staves 138, there may be sixteen wavenumbers, with wavenumbers 1 to 7 propagating in a clockwise direction and wavenumbers −1 to −7 propagating in a counterclockwise direction. For wavenumber 4, each wave has four wavelengths around the casing 208 with different signal strengths. In the example shown in FIG. 5B, a strong wave at approximately 20 kHz had four wavelengths around the casing 108, but at 30 KHz, a wave is not present because there is not a mode of propagation that would provide four wavelengths around the casing 108 at a frequency of 30 kHz. Angular velocity is a ratio of the wavenumber to the frequency, which is illustrated in color. The red color demonstrates that there is primarily one angular velocity of the wave but the other colors show that there are other velocities at which the wave will propagate a well. Thus, the Fourier transform of the compressed data 502 from the time domain to the frequency domain separates the waves into the separated waves 504. The separated waves 504 include clockwise waves and counterclockwise waves. The clockwise waves and the counterclockwise waves each appear twice in the separated waves 504 as complex conjugates.

Figure 5C:
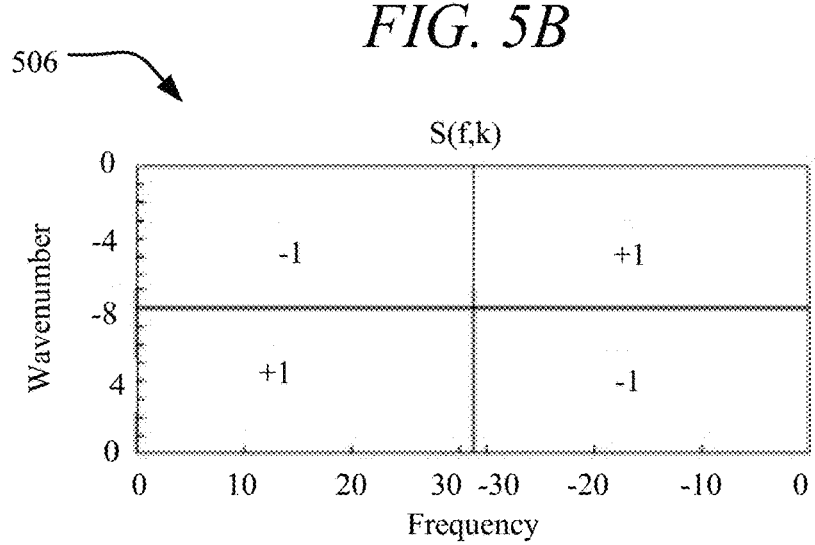
FIG. 5C shows shifting of the clockwise waves and the counterclockwise waves.

Turning to FIG. 5C, the clockwise waves and the counterclockwise waves of the separated waves 504 are shifted in opposite directions to generate shifted waves. The shift function 506 may be defined as S(f,k). The sections of the shift function 506 correspond to the clockwise waves and counterclockwise waves, as well as their complex conjugates. The counterclockwise waves are shifted −1 and the clockwise waves are shifted +1. Stated differently, the clockwise waves are forward shifted and the counterclockwise waves are backshifted.

In the example with sixteen staves, the wavenumber k ranges from −8 to +7 and the angular step size in radians between the staves is $= \frac{2\pi}{16}$.

To find the angular rotation α for each point the complex plane, S is multiplied by the wavenumber k, the angular step size θ, and a number of steps corresponding to the transmission number N. The angular rotation may thus be given by:

$$\alpha = S(f,k) \times Nk\theta$$

The shift is given by multiplying the transmission by $e^{i\alpha}$:

$$R(f,k,N) = M(f,k,N) \times e^{i\alpha}$$

This provides the result for the Nth transmission. The result contains shifted versions of both the clockwise and counterclockwise waves, with the amplitude having the same relationship and the phases changing with the shift. The calculation is repeated for all the transmissions for each of the staves 138 (e.g., all sixteen transmissions) and the results are added:

$$R(f,k) = \Sigma R(f,k,N)$$

Figure 5D:
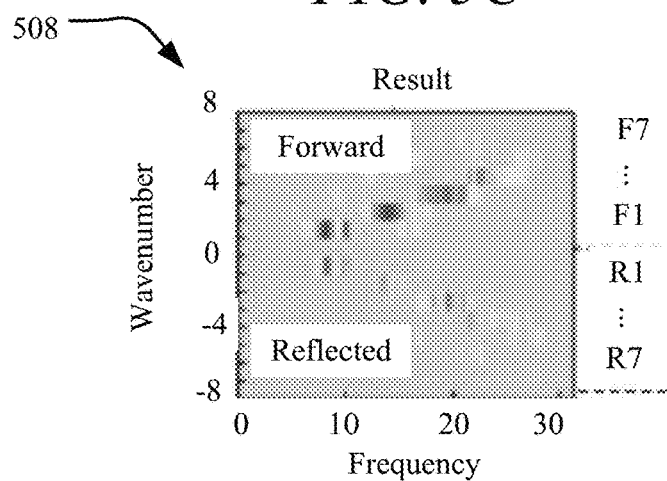
FIG. 5D illustrates a region of interest including forward and reflected waves generated by adding the shifted clockwise waves and the shifted counterclockwise waves.

By adding the shifted counterclockwise waves together, a reflected wave is formed, and the shifted clockwise waves are added together to form a forward wave. The results 508 for a region of interest are illustrated in FIG. 5D. In one implementation, the region of interest may be limited to the positive frequencies of the forward and reflected waves and their amplitudes. Stated differently, the waves having negative frequencies are complex conjugates of the waves having positive frequencies, the complex conjugates may be discarded, with the region of interest focusing on the positive frequencies of the forward and reflected waves and their amplitudes. For clarity, the region of interest of the results 508 may be shifted vertically such that the zero wavenumber appears in the middle with the forward waves located at the top and the reflected waves at the bottom of the results 508.

Figure 5E:
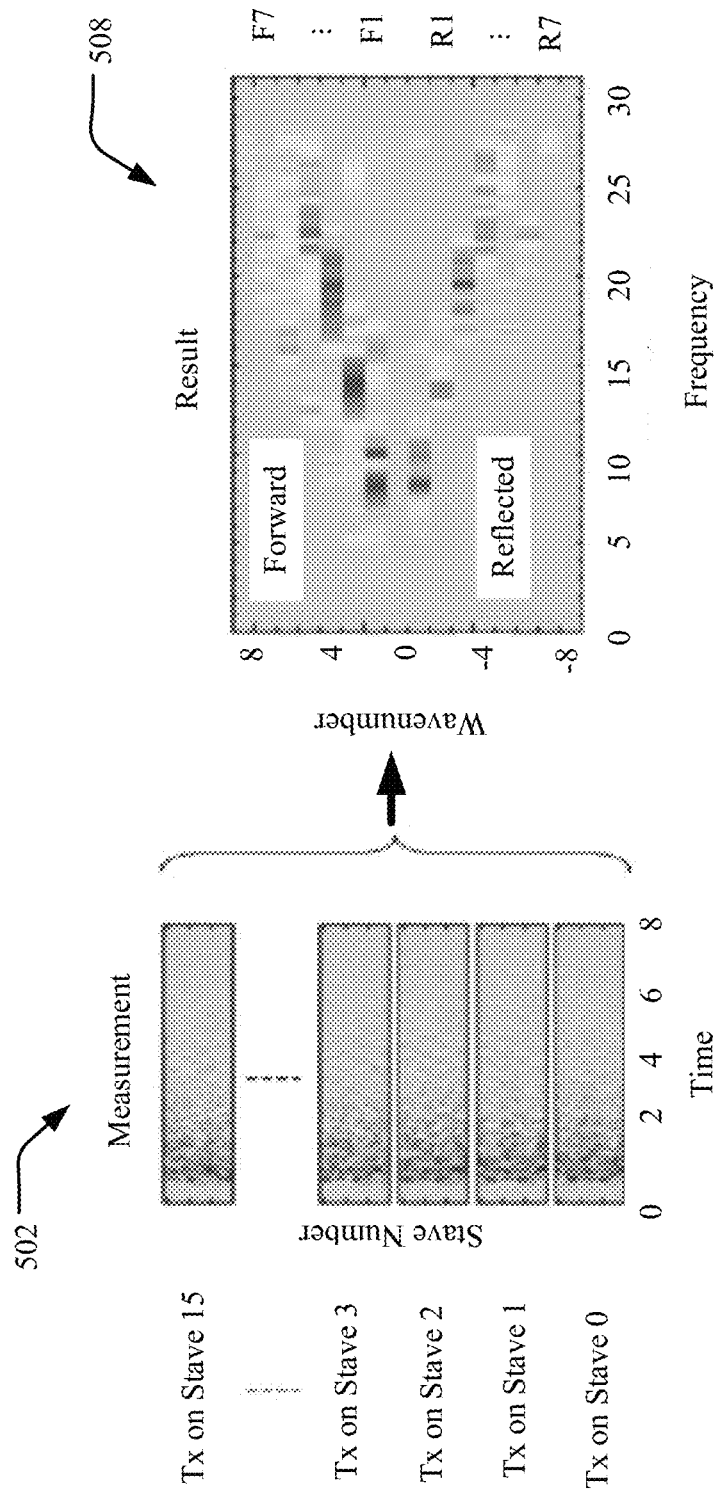
FIG. 5E illustrates a single measurement by the radial sensor converted into a single result.

As shown in FIG. 5E, generally the compressed data 502 for each of the staves 138 is converted from the time domain to the frequency domain, shifted, and combined into the result 508. Each horizontal line corresponds to a spectrum, and reading from zero wavenumber, the forward spectra are F1 to F7 and the reflected spectra are R1 to R7. The horizontal lines of 0 and 8 do not have a direction. As described herein, the wavenumbers are integers corresponding to a number of wavelengths fitting around the production tube 106 and/or the casing 108. For example, R2 has long waves with just two fitting around the production tube 106 and/or the casing 108, and R6 has shorter waves with six fitting around.

Figure 6A:
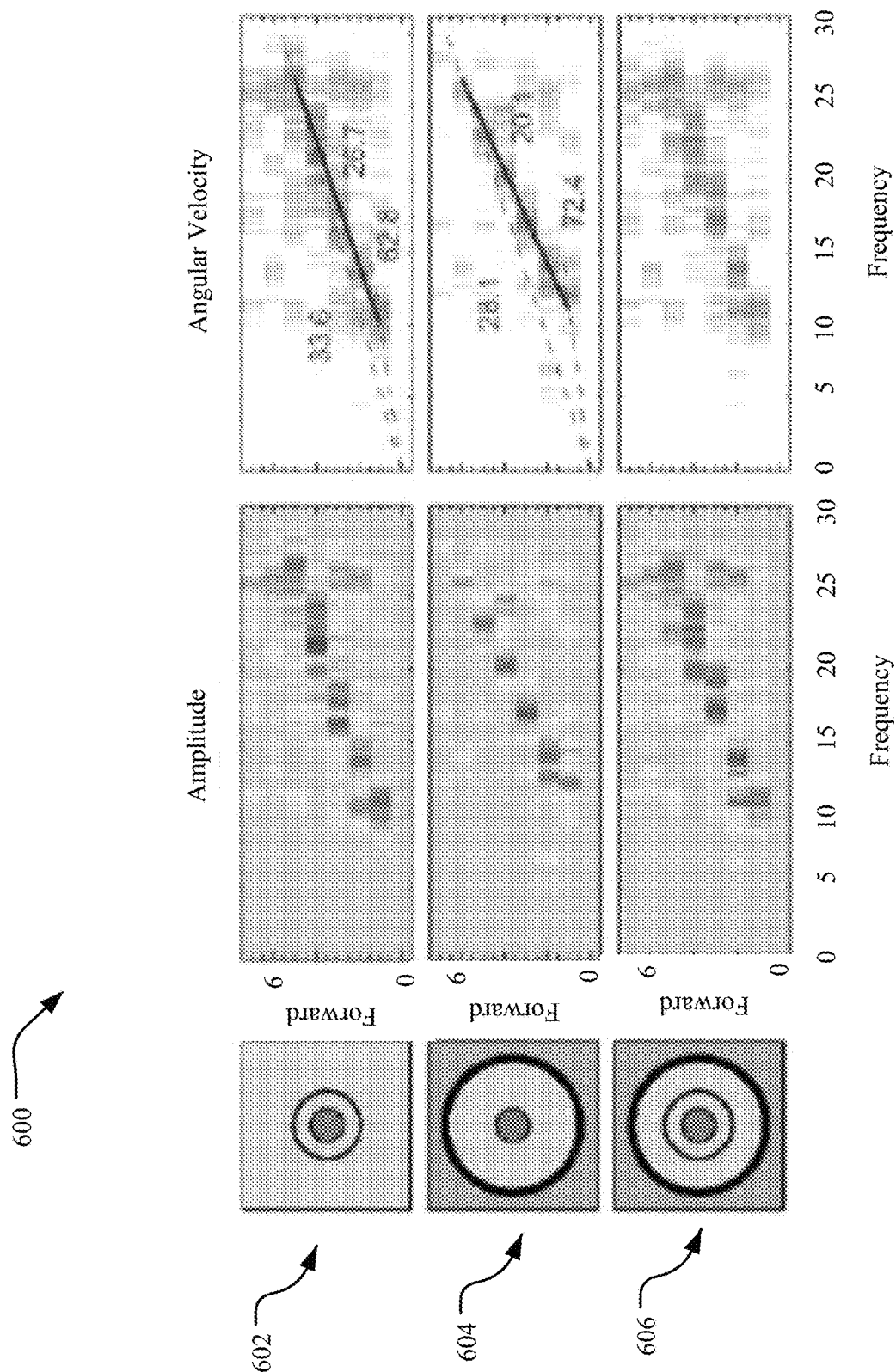
FIG. 6A shows a comparison of wave propagation through a production tube, a casing, and a production tube and casing.
Figure 6B:
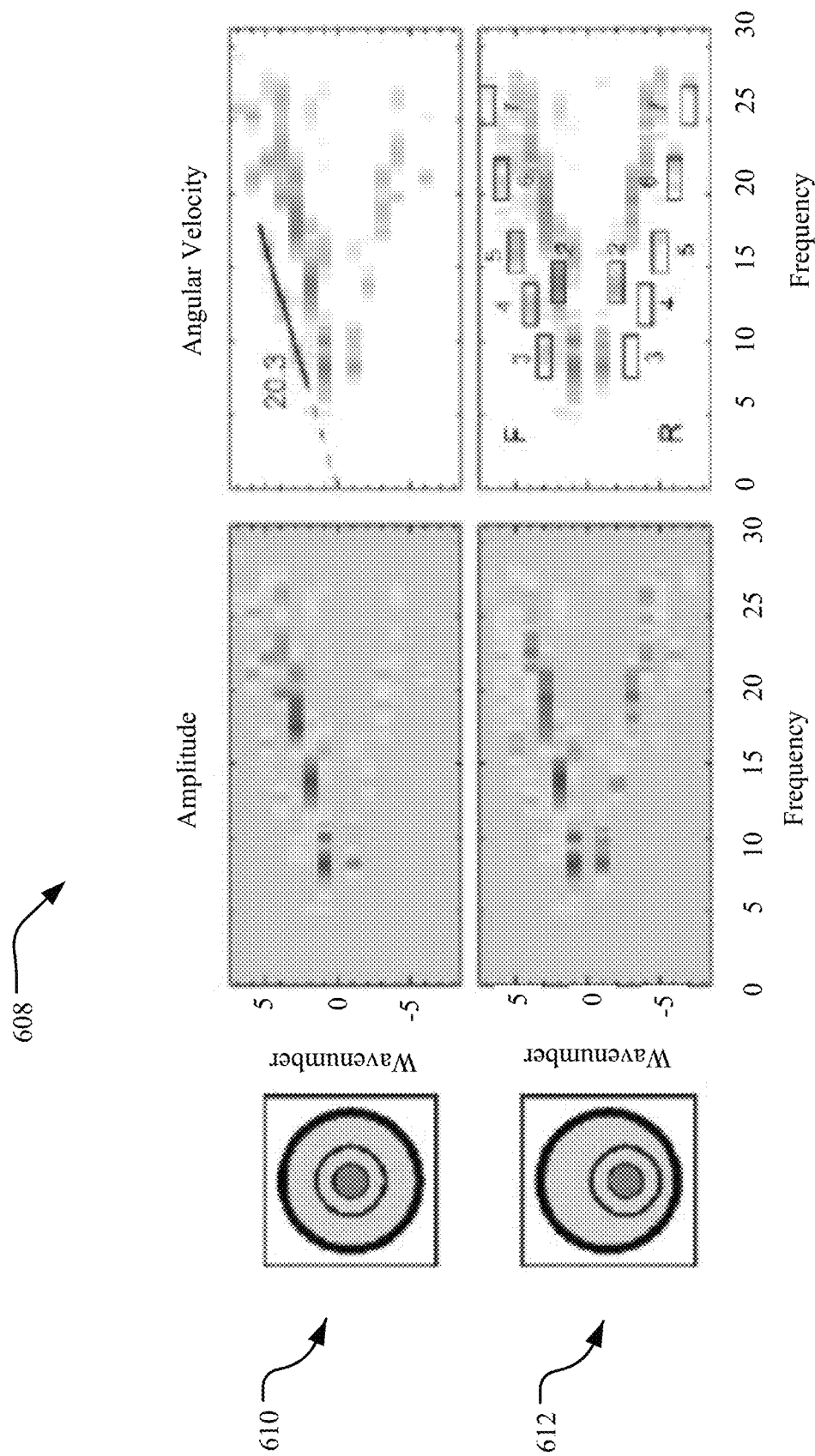
FIG. 6B illustrates a comparison of wave propagation through a production tube that is concentric and eccentric.

Referring to FIGS. 6A-6B, an analysis of eccentricity and orientation of the production tube 106 inside the casing 108 is provided. Turning first to FIG. 6A, modeling 600 provides an analysis 602 of the production tube 106, and analysis 604 of the casing 108, and an analysis 606 of the production tube 106 within the casing 208 are provided for comparison of wave propagation. For each analysis 602-606, forward waves are obtained, with the results including the amplitudes of the forward waves. The configurations associated with the analyses 602-606 do not include any asymmetrical features, such that there is no reflected wave.

With respect to the analysis 602, the results include a bright red diagonal corresponding to a primary mode propagating with a primary angular velocity around the production tube 106 corresponding to the blue line. In other words, a diagonal in the frequency domain corresponds to a velocity. The angular velocity may be converted to a linear velocity. For example, the angular velocity for the analysis 602 may be approximately 26.7 krad/s, which is approximately 1430 m/s as a linear velocity. The angular velocity for the analysis 604 may be approximately 20.1 krad/s, which converts to a linear velocity of approximately 2310 m/s. The group velocities of 1430 m/s and 2310 m/s illustrate a correspondence to Lamb waves in the production tube 106 due to fluid being present on both sides and a correspondence to Rayleigh waves in the casing 108 due to a solid being present on one side due to the cement 116.

As illustrated by the blue line not intersecting the origin, the analysis 602 and 604 are characteristic of a dispersive system, where different frequencies travel with different modes. Tangents to the upper and lower ends of the blue line, shown in red, are at 33.6 krad/s and 62.8 krad/s for the analysis 602 and at 28.1 krad/s and 72.4 krad/s for the analysis 604. The red lines are phase velocities, which are higher than a group velocity shown in blue. In terms of angular frequency $\omega=2\pi f$, $$\text{the group velocities are } \frac{\omega}{k} \text{ and } \frac{d\omega}{dk}.$$

In other words, a peak or a trough at the back of a wave group will move gradually towards the front.

As shown with a comparison between the analyses 602-604, the blue lines in each are very similar because the difference in the angular velocities of the production tube 106 and the casing 108 is roughly the same as the difference in their radii. Accordingly, separation of the production tube 106, which is not of interest, from the casing 108, which is of interest appears to be impractical in this manner according to the modeling 600.

However, turning to FIG. 6B, in practice, measured results 608 including an analysis 610 of the production tube 106 in the casing 108 in a concentric configuration and an analysis 612 of the production tube in the casing 208 in an eccentric configuration. Both the forward and reflected spectra are included for each of the analyses 610-612. Conceptually, the concentric configuration would not include reflected spectra due to the concentricity, as detailed herein. However, in practice, true concentricity is typically not achieved, for example due to the spacers 104 being loose enough to allow free movement inside the production tube 106. As such, the small amount of eccentricity present in the concentric configuration corresponding to the analysis 610 results in faint a reflected spectrum.

The analysis 610 shows a strong amplitude in the middle in red that was predicted by the modeling 600. This amplitude is unsuitable for anomaly detection as discussed above. However, there is a fainter amplitude above the strong amplitude that is marked with the blue line in the angular velocity plot. The blue line is a different propagation mode having an angular velocity of approximately 20.3 krad/s and a linear velocity of approximately 2340 m/s. The blue line is a non-dispersive velocity that is traveling in what would otherwise be a dispersive system. Using the non-dispersive velocity, the production tube 106 may be separated from the casing 108 for analysis of the casing 108. Further, it will be appreciated that other dispersive velocities may exist that can be utilized to separate the production tube 106 from the casing 108.

The analysis 612 shows that eccentricity results in a strong reflected wave, even if there are no anomalies present outside the casing 108. Generally, the spectra do not provide useful information. However, the boxes around portions of the forward spectrum and the reflected spectrum identify useful information. The boxes identifying portions of the forward spectra generally provide information on eccentricity and orientation of the production tube 106 within the casing 108, and the boxes identifying portions of the reflected spectra generally provide information regarding isolation and material type, as well as eccentricity. The portions of the forward spectrum that may provide information regarding eccentricity and orientation include F2, F3, F4, and F7, for example. The portions of the reflected spectrum that may provide useful information regarding orientation R2, R3, and R5, for example. It will be appreciated that the number of the staves 138 can be in any order based on eccentricity of the production tube 106 and the casing 108. As such the reference to the numbering is for illustration purposes only and not intended to be limiting. Each box in this example has a 2.8 kHz bandwidth, and the table below provides more detail for each of the boxes:

| Spectrum | Center Frequency (kHz) | Character |
|---|---|---|
| F2, R2 | 14 | Provides an amplitude reference, as it is well away from the propagation mode of interest and shows almost no variation with any other parameters. |
| F3, R3 | 9 | F3 is sensitive to impedance, such that it may be used to indicate cement, while R3 is sensitive to impedance and highly sensitive to eccentricity and anomalies. |
| F4 | 12.5 | F4 has a frequency that at a peak amplitude varies with eccentricity but not with any other parameters. |
| R5 | 16 | R5 is sensitive to impedance and highly sensitive to eccentricity and anomalies. |
| F7 | 26 | F7 has a frequency that at a peal amplitude is high when concentric but very low otherwise, even for just slight eccentricity. |

As can be understood from the table, F2 and R2 may be used as a reference. For example, because F2 is almost completely independent of any other changes, where environmental changes in the downhole environment 101 occur (e.g., temperature, pressure, etc.), F2 may be used as a reference or calibration. While F3 may be used to indicate material type, such as cement, R3 and R5 are highly sensitive to isolation detection and material type identification. F4 provides may be used to detect eccentricity, and F7 may be used in combination with F4. Orientation may be found using convolution to detect the axis of symmetry, followed by phase comparison with a known reference to determine axis alignment.

Certain aspects of the present disclosure provide a multiple case bond logging (MCBL) radial tool for the purpose of isolation detection from within a production tube in presence of eccentricity. Building on the forward wave (e.g., endfire) technique described herein, a symmetry invariant may be utilized in enhancing the determination of isolation in the presence of eccentricity.

Figure 7:
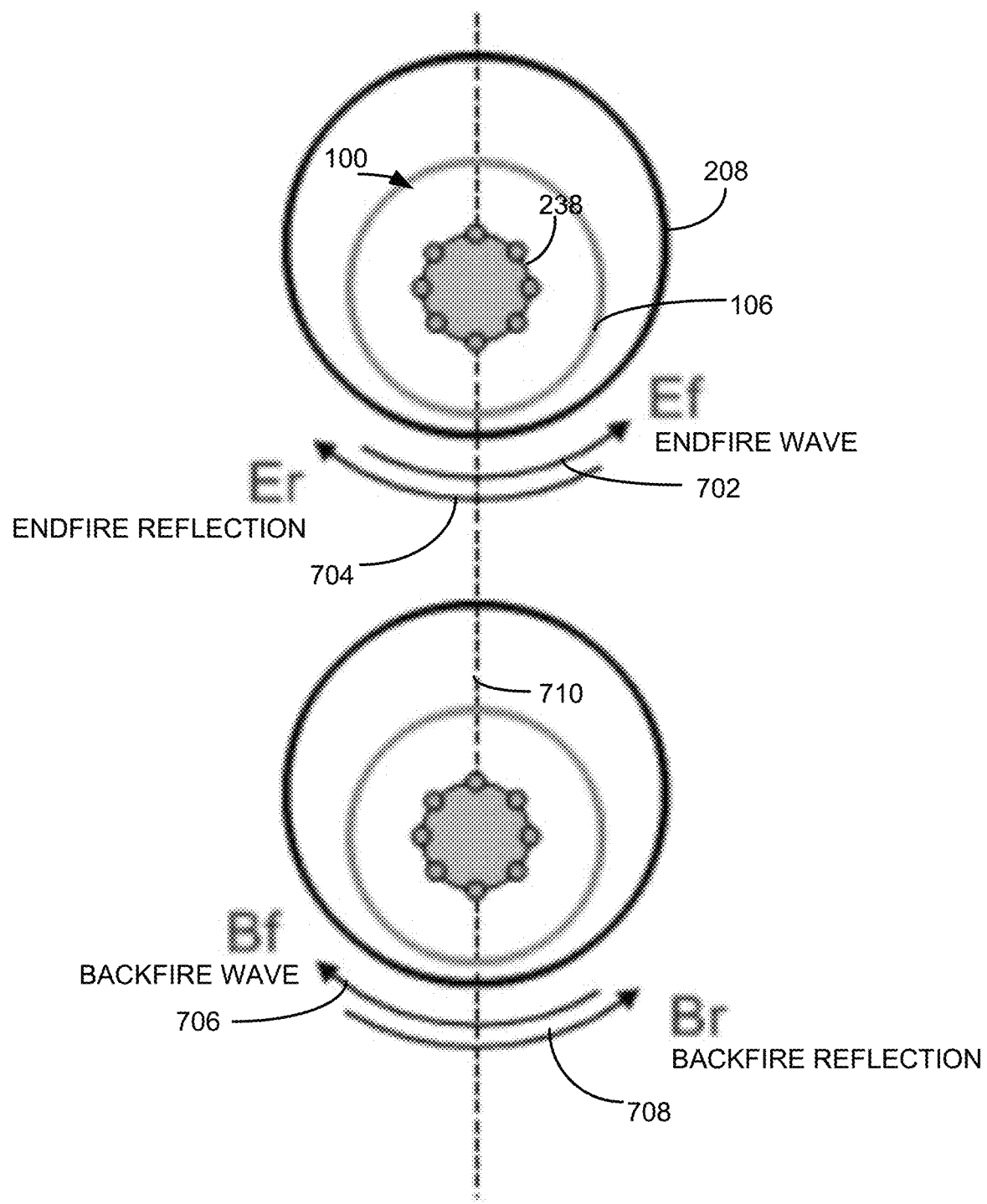
FIG. 7 illustrates forward and reverse acoustic waves for isolation detection, in accordance with certain aspects of the present disclosure.

FIG. 7 illustrates an example radial forward wave (e.g., also referred to as an endfire (Ef) wave) and reverse wave (e.g., also referred to as a backfire (Bf) wave) sensing configuration used to cancel (or at least reduce) the effect of concentricity, in accordance with certain aspects of the present disclosure. As shown, a radial forward wave 702 (Ef) (e.g., corresponding to forward wave 302) may be implemented in a first radial direction. For example, as described herein, the forward wave 702 may be formed by firing one of the staves 138, listening on all of the staves 138, firing another of the staves 138 (e.g., an adjacent one of the staves 138 in a counterclockwise direction) and listening again of all of the staves 138, and so on until each of the staves 138 has transmitted. As described, an asymmetry on the casing may provide a forward wave reflection 704 (e.g., also referred to as an endfire reflection (Er)). The forward wave reflection 704 (e.g., a reflection wave of the forward wave 702) is in the clockwise direction, as shown in FIG. 7 and described herein with respect to FIG. 4A. The asymmetry may be detected based on expression:

$$\frac{Er}{Ef}$$

where Ef is a parameter (e.g., amplitude and/or phase) associated with the radial forward wave 702, and Er is a parameter (e.g., amplitude and/or phase) associated with the forward wave reflection 704.

However, as described herein, the acoustic logging tool 100 may be eccentric to one side of the wellbore, as shown. A reflection wave may be caused due to the eccentricity of the acoustic logging tool 100. In other words, even without an asymmetric feature (e.g., asymmetric feature 418) causing the reflection, the reflection waves may still be generated due to the eccentricity of the acoustic logging tool 100.

Certain aspects of the present disclosure are directed to techniques for cancelling (or at least reducing) the effects of eccentricity by using a reverse acoustic wave (e.g., also referred to herein as a backfire (Bf) wave). A reverse wave generally refers to an acoustic wave that is processed based on a reverse radial direction as the forward acoustic wave (e.g., Ef wave) described herein. After the forward acoustic wave 702 is generated and the corresponding forward wave reflection 704 is sensed, a reverse acoustic wave 706 may be generated in a similar manner as the forward acoustic wave. For example, the reverse acoustic wave 706 may be formed by firing one of the staves 138, listening on all of the staves 138, firing another of the staves 138 (e.g., an adjacent one of the staves 138) and listening again of all of the staves 138, and so on until each of the staves 138 has transmitted. The forward and reverse acoustic waves may be associated with opposite radial directions (e.g., clockwise and counterclockwise directions).

A reverse acoustic wave reflection 708 in the opposite direction (e.g., counterclockwise direction) may be received and sensed by the staves 138. A reverse wave ratio (e.g., a backfire ratio) may be calculated using expression:

$$\frac{Br}{Bf}$$

where Bf is a parameter (e.g., amplitude and/or phase) associated with the radial reverse acoustic wave 706, and Br is a parameter (e.g., amplitude and/or phase) associated with the reverse acoustic wave reflection 708.

Due to the symmetry associated with the sensing system at axis 710, the forward wave ratio and the reverse wave ratio should be about the same. Thus, the effects of the eccentricity of the acoustic logging tool 100 may be cancelled by comparing the ratios. In other words, due to the symmetry of the sensing system, the ratio of the forward acoustic wave and the forward acoustic wave reflection may be the same as the ratio of the reverse acoustic wave and the reverse acoustic wave reflection. Thus, a symmetry invariant (S) may be calculated by dividing two ratios (or multiplying one reverse wave ratio by the inverse of forward wave ratio). In a symmetrical system, the symmetry invariant is equal to 1. The symmetry invariant (S) may be calculated based on equation:

$$S = \frac{Er}{Ef} \times \frac{Bf}{Br}$$

As shown, the acoustic logging tool 100 is in the production tube 106 within the casing 108. The production tube 106 does not change the symmetry associated with the sensing system. Thus, even within the production tube 106, the symmetry invariant should be equal to about 1 (e.g., when no asymmetry exists on the casing). In other words, S is invariant under eccentricity. Moreover, S may be independent of sensor orientation. For example, if a sensor is rotated by an angle θ, then S may be equal to:

$$S = \frac{Er \times e^{-j2\theta}}{Ef} \times \frac{Bf}{Br \times e^{-j2\theta}}$$

Thus, terms ($e^{-j2\theta}$) associated with the rotation of the sensor cancel out, and may not have an effect on the symmetry invariant S. Thus, a log of the symmetry invariant may be used to detect isolation almost independently of eccentricity effects. The symmetry invariant log may be generated for any suitable one of multiple wavenumbers that are available. As one example, the symmetry invariant may be generated for wavenumber 4, although any other wavenumber may be used. While some examples provided herein, such as the illustration of FIG. 7, make reference to forward and reverse acoustic waves (e.g., forward wave 702 and reverse acoustic wave 706) being sent in opposite directions to facilitate understanding, in practice, wave direction may be dealt with as part of the processing of the waves and associated reflections.

Figure 8:
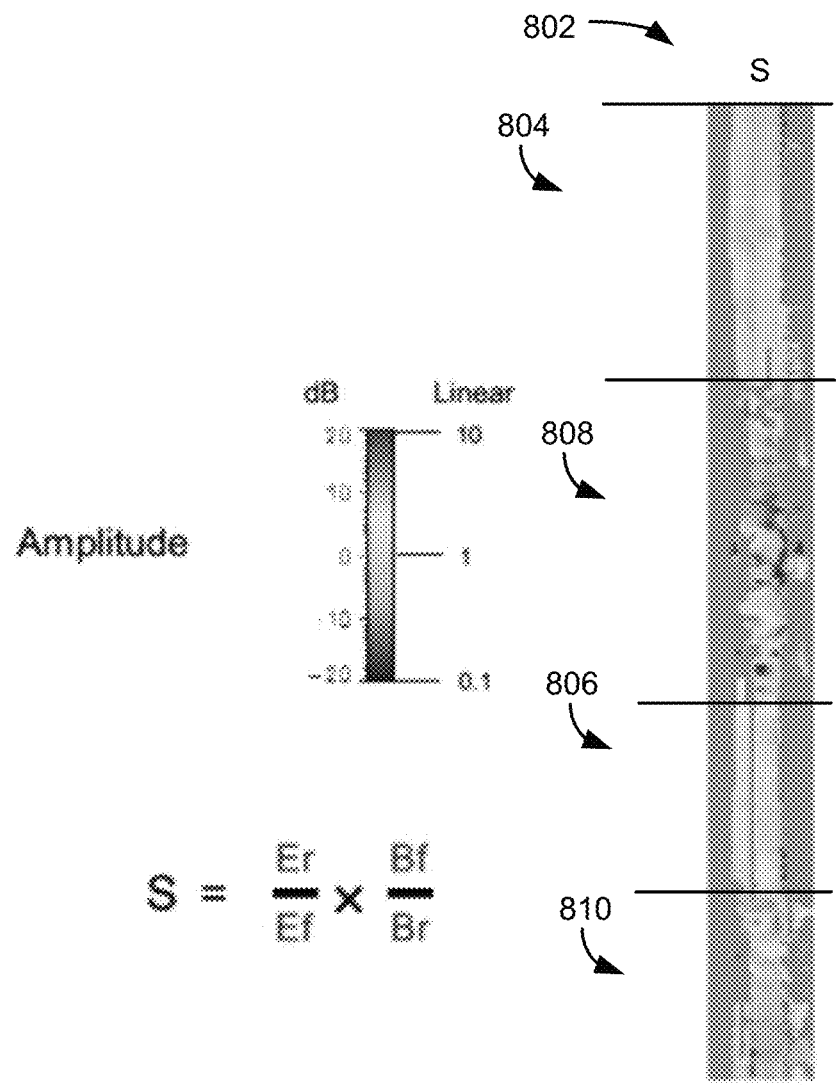
FIG. 8 illustrates a symmetry invariant log, in accordance with certain aspects of the present disclosure.

FIG. 8 illustrates a symmetry invariant log for a particular wavenumber, in accordance with certain aspects of the present disclosure. In some aspects, the symmetry invariant log 802 may be for wavenumber 4, as described. As shown, the log 802 shows a calculated symmetry invariant which may be equal to about 1 for a symmetrical system. The symmetry invariant is shown for different regions of the wellbore. As shown, the calculated symmetry invariant is more continuous in some regions and less continuous in others. For example, in regions 804, 806 of the wellbore, the symmetry invariant is more continuous around an amplitude value of 1, wherein in regions 808, 810, the symmetry invariant fluctuates greatly (e.g., is disrupted). In areas of the wellbore where measurements in region 804 are taken, there may be water beyond the casing of the wellbore, or as another example, in areas of the wellbore where measurements in region 806 are taken, there may be cement beyond the casing of the wellbore, causing the observed fluctuations.

Isolation may be detected for a region with a continuous symmetry invariant, as described in more detail herein.

Figure 9:
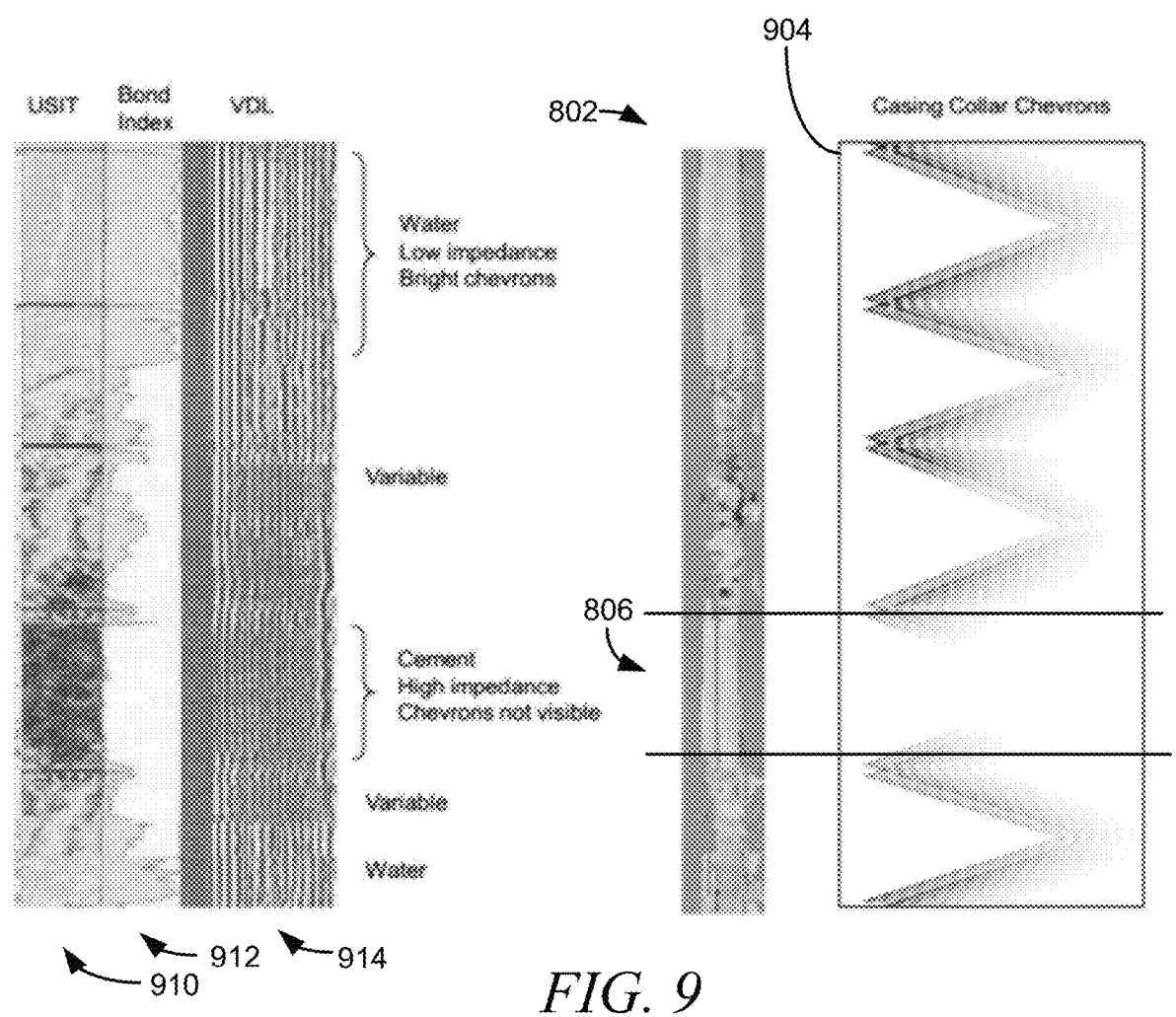
FIG. 9 illustrates a symmetry invariant log and casing color chevrons, in accordance with certain aspects of the present disclosure.

FIG. 9 illustrates a symmetry invariant log 802 along with casing collar chevrons 904, in accordance with certain aspects of the present disclosure. Measurements on a wellbore are made and presented using an ultrasonic imager tool (USIT) log 910, bond index log 912, and variable density log (VDL) 914. The chevrons 904 associated with the VDL in region 806 are feint, as shown. Isolation may be detected for region 806 based on the observation of the faint chevrons. As shown, the symmetry invariant log 802 is relatively more continuous in region 806 (e.g. as compared to other regions of log 802), also indicating isolation for region 806, showing that such continuity represents isolation independently of eccentricity.

Figure 10:
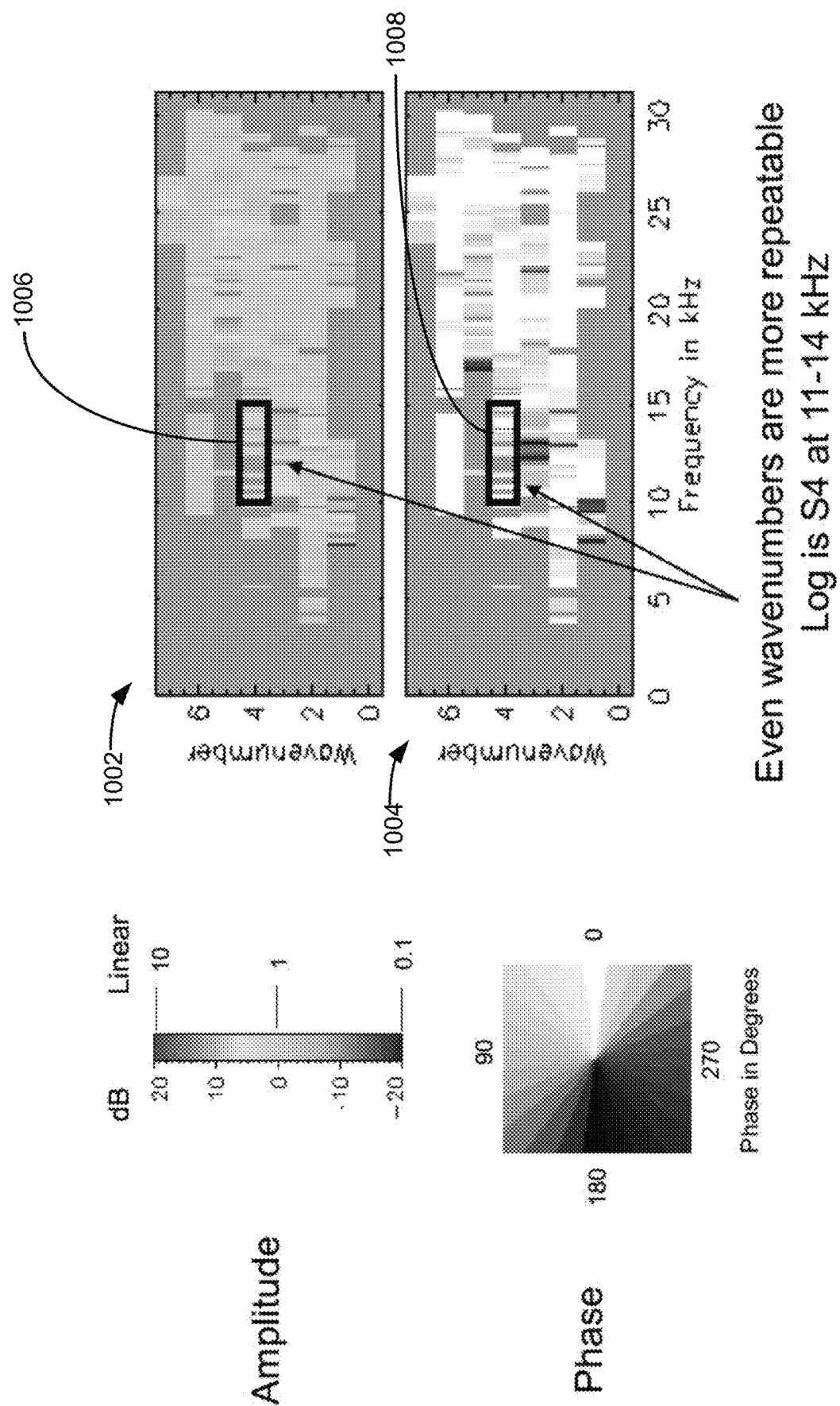
FIG. 10 illustrates amplitude and phase plots associated radial sensing, in accordance with certain aspects of the present disclosure.

FIG. 10 illustrates an amplitude log 1002 and a phase log 1004 for generating a symmetry invariant, in accordance with certain aspects of the present disclosure. As shown, amplitude and phase measurements for wavenumbers 0-8 are shown as a function of frequency (e.g., by converting time domain plots to frequency domain plots using a Fourier transform). Based on analysis of amplitude and phase logs, some wavenumbers may be better suited for isolation detection. For example, odd wavenumbers may be more sensitive to characteristics of the wellbore than even wavenumbers. While a more sensitive wavenumber may provide a greater amount of information, using logs that are associated with more sensitive wavenumbers may introduce complexities that may be difficult to process. Even wavenumbers, such as wavenumber 4 at 11-14 kHz, may be less sensitive to wellbore characteristics and provides more repeatable measurement results that can be used for a more reliable identification of isolation. Thus, a symmetry invariant log may be generated for wavenumber 4 including the data 1006 of the amplitude log 1002 and data 1008 of the phase log 1004. However, it should be understood that any wavenumber may be used for generating a symmetry invariant for isolation detection using the techniques described herein.

In some aspects, acoustic logging tool 100 may generate acoustic waves (e.g., Rayleigh waves) that penetrate beyond the casing, which is importance for isolation detection. The MCBL radial tool technology and data processing techniques described herein can reliably determine the impedance of materials beyond the casing from within the production tube.

In addition, characteristics of the symmetry invariant log informs whether the material beyond the casing is free from features that would compromise the ability to support isolation. In some implementations, determination of the symmetry invariant may be based on a small portion (e.g., 11-14 kHz) of the available spectrum, as described herein. The full spectrum contains a large amount of information which, once properly processed, has the potential to enable the acoustic logging tool 100 to map individual features of the wellbore. While the cement/casing bond can be observed using existing tools (e.g., using chevrons as described), the quality of cement further away or the properties of the surrounding formation may not be observed using existing tools. The signals from acoustic logging tool 100 penetrate beyond the casing and can provide further information for processing and isolation detection. Certain aspects are directed towards processing of radial tool measurements (e.g., as performed in a modified radial test rig) that provide an indication of the extent of wave penetration into the formation and the impact on reflected spectra and channel detection.

Figure 11:
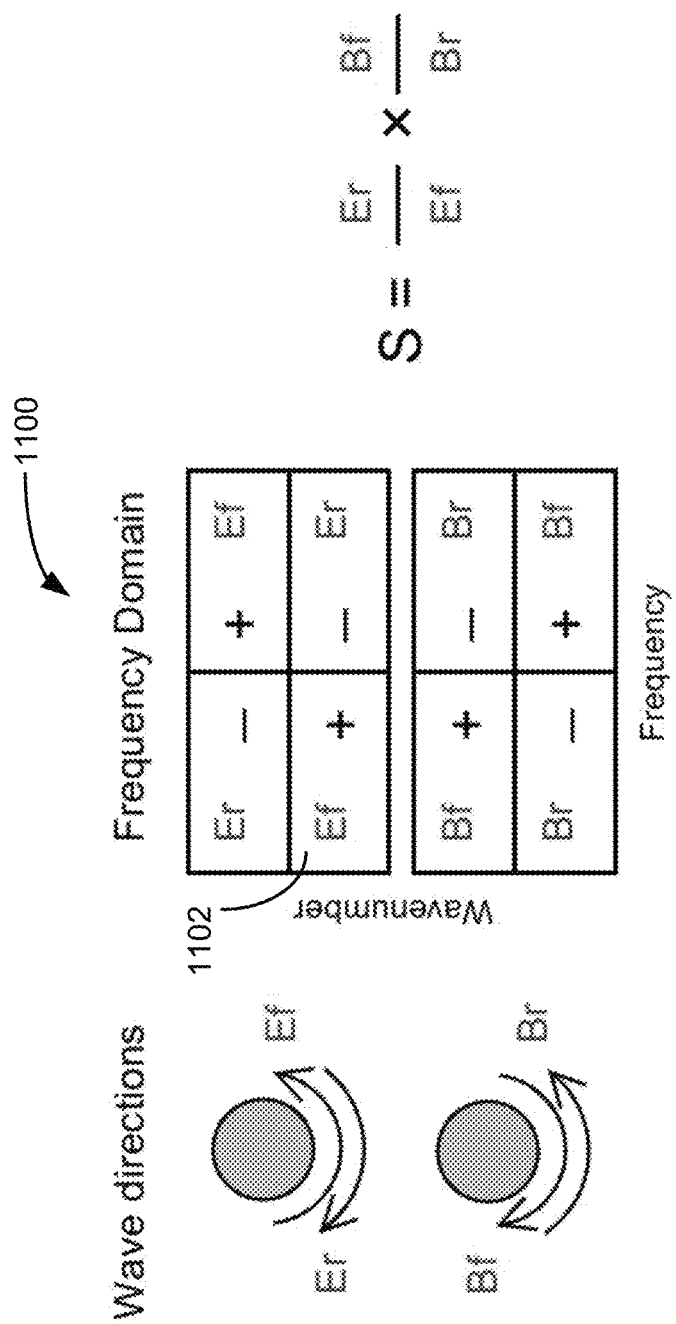
FIG. 11 illustrates forward and reverse acoustic waves and associated reflections in the frequency domain, in accordance with certain aspects of the present disclosure.

FIG. 11 illustrates a frequency domain plot 1100 of forward wave and reverse wave measurements, in accordance with certain aspects of the present disclosure. Ef, Bf, Er, and Br are calculated from recorded data using positive or negative phase shifts in the frequency domain. For example, Ef and Bf may be calculated from recorded data using a positive (+) phase shift, and the Er and Br may be calculated from recorded using a negative (−) phase shift. Hence, the symmetry invariant (S) is a complex quantity having both amplitude and phase. It has the property that S equals 1 for any symmetrical system, as described. An advantage of this defined amplitude is that logs can be directly compared. For instance, logs of the same well that are run at different times may be compared to provide a more accurate isolation detection.

The acoustic wave direction depends on which way the elements (e.g., staves 138) are numbered. Ef travels opposite to the numbering direction. For example, if the elements are numbered in a clockwise direction, the direction of Ef is anticlockwise. This is a consequence of the definition of Ef as being calculated using a positive frequency and wavenumber (e.g., as shown by the quadrant 1102 of the fourier Transform shown in plot 1100). In some aspects of the present disclosure, from a single measurement, the resulting symmetry invariant is a pair of two-dimensional plots (amplitude and phase), as shown and described in more detail herein. A conventional system would produce many different amplitude and phase logs which would be difficult to compare.

Figure 12:
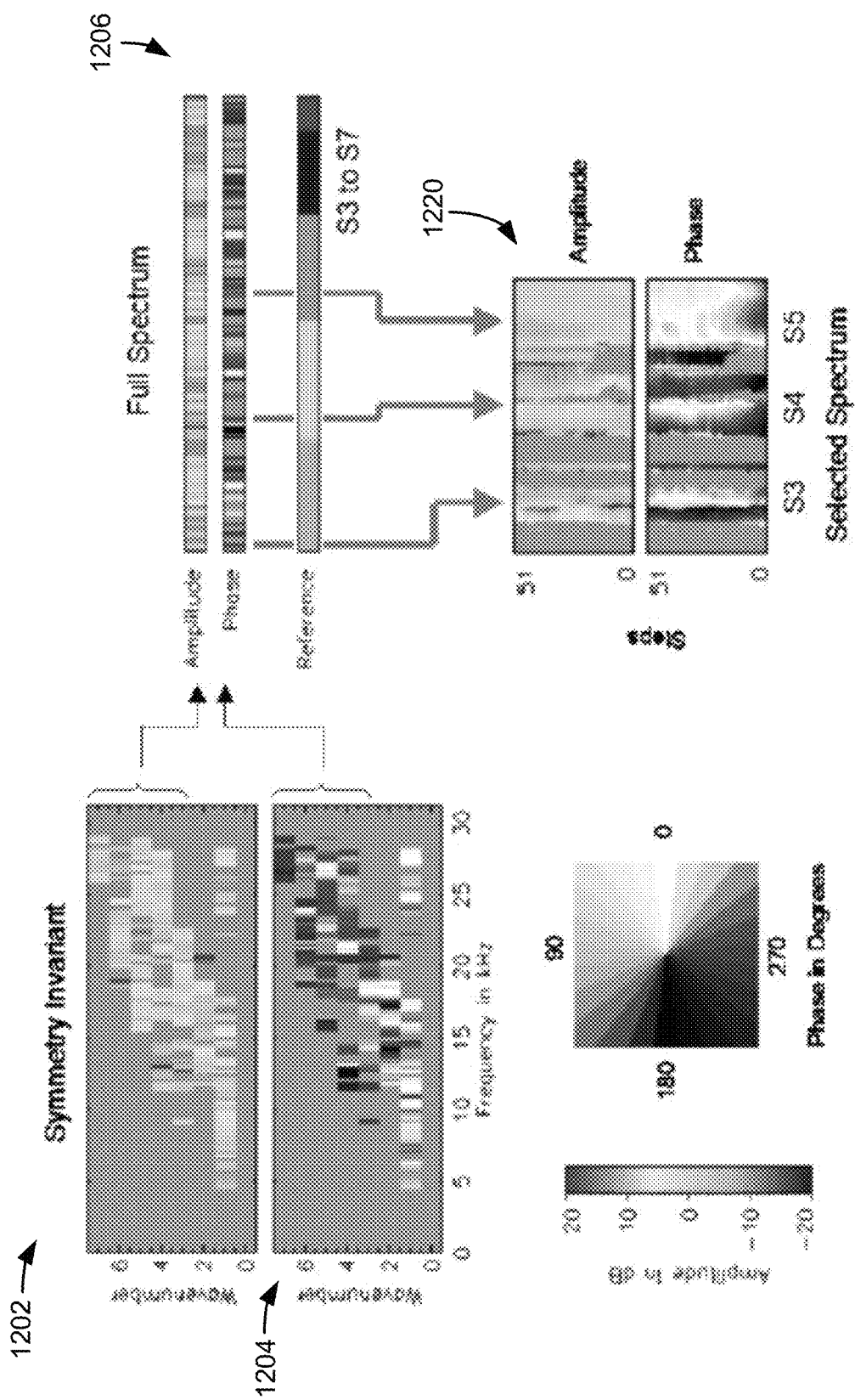
FIG. 12 illustrates a symmetry invariant log generated by conversion of a full spectrum plot to a single line plot, in accordance with certain aspects of the present disclosure.

FIG. 12 illustrates two-dimensional plots 1202, 1204 for amplitude and phase, respectively, in accordance with certain aspects of the present disclosure. Many combinations of frequency and wavenumber are modes which do not propagate (e.g., waves having no amplitude). These are shown as grey in plots 1202, 1204.

Single line plots 1206 are generated using only portion of data in plots 1202, 1204, as shown. For example, the data from wavenumbers 1 and 2 are not included since they have long wavelengths and may be corrupted by axial reflections from the top and bottom of the relatively short casing and production tube.

Using the plots 1206, amplitude and phase logs 1220 may be generated, each having 51 steps. Each step provides a single line which can be a full spectrum from the single line plots 1206 for generation of the symmetry invariant log, or alternatively just selected regions of interest of the single line plots 1206.

Figure 13:
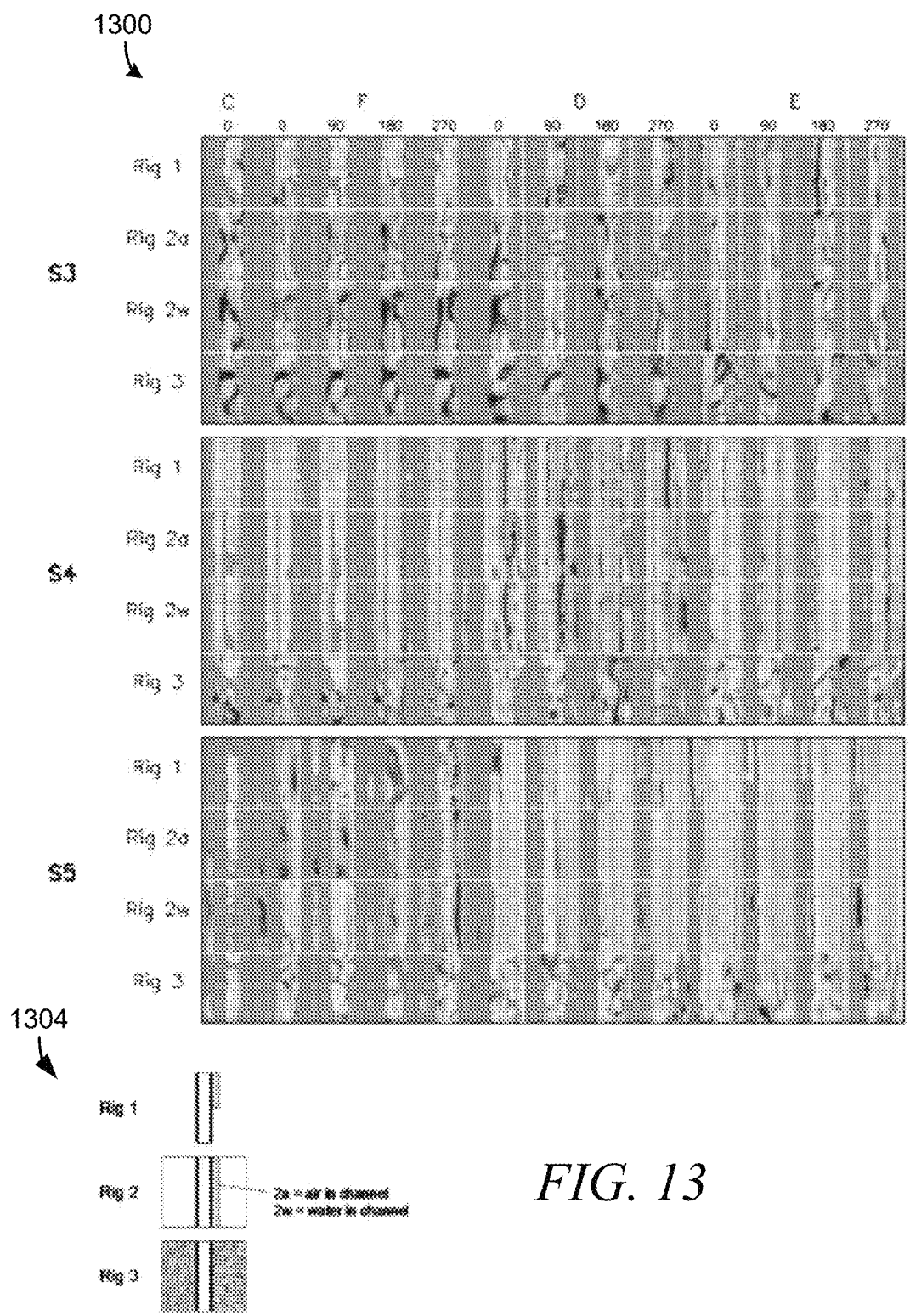
FIG. 13 illustrates symmetry invariant logs generated for different rig configurations, in accordance with certain aspects of the present disclosure.

FIG. 13 illustrated symmetry invariant amplitude logs 1300 for various rigs, in accordance with certain aspects of the present disclosure. Each plot is a log of 51 steps, which are divided into separate groups for each of S3, S4 and S5 (e.g., symmetry invariant logs for wavenumbers 3, 4, and 5, respectively), and each group shows various eccentricities and orientations that are implemented using different spacers labeled "C", "D", "E", and "F." Diagram 1304 shows configuration of the different rig constructions for which measurements are shown. Rig 1 has a bare casing with a half-length channel, rig 2 has a full channel and formation with a failed cement bond, and rig 3 has a formation but no channel.

The S3 spectrum is complicated while S4 and S5 are smoother for rigs 1 and 2 but complicated for rig 3. Therefore, signals on rig 3 penetrate into the formation which is a random collection of paving slabs, wooden blocks and polystyrene in a cement matrix. The penetration is most obvious in S4. It cannot be seen in S3 because it is obscured by other variations and S5 is rather ambiguous. As described herein, odd wavenumbers are sensitive while even wavenumbers have more propagation modes but are less sensitive (e.g., mainly white in phase).

As described, the reflected spectrum varies depending upon eccentricity or orientation. Certain aspects provide a radial tool to gather data for impedance determination and multiple reflected spectra and symmetry invariant responses. By logging symmetry invariant in a region of detected high impedance, the radial tool described herein distinguishes between continuous or rapidly changing structures beyond the casing (e.g., whether the spectra appear smooth). If the symmetry invariant is not smooth, then there are discontinuities such as fractures or voids so the region does not have reliable isolation. This can be seen because of the low sensitivity of the symmetry invariant for specific wavenumbers (e.g., wavenumber 4). In other words, the smoothness of the symmetry invariant does not change with eccentricity or orientation and thereby offers a technique for isolation detection.

Most propagation modes are not sensitive to features outside the casing because there is no significant displacement on its outer surface. Consequently, the sensing system has symmetry in these modes and predicts a symmetry invariant of 1 with a phase of 0° for a symmetrical system. Different measurements may have an offset with regards to phase. This may be due to alignment differences of the top and bottom spacers (e.g., spacers 104) across measurements with the production tube not being exactly parallel to the casing.

Figure 14:
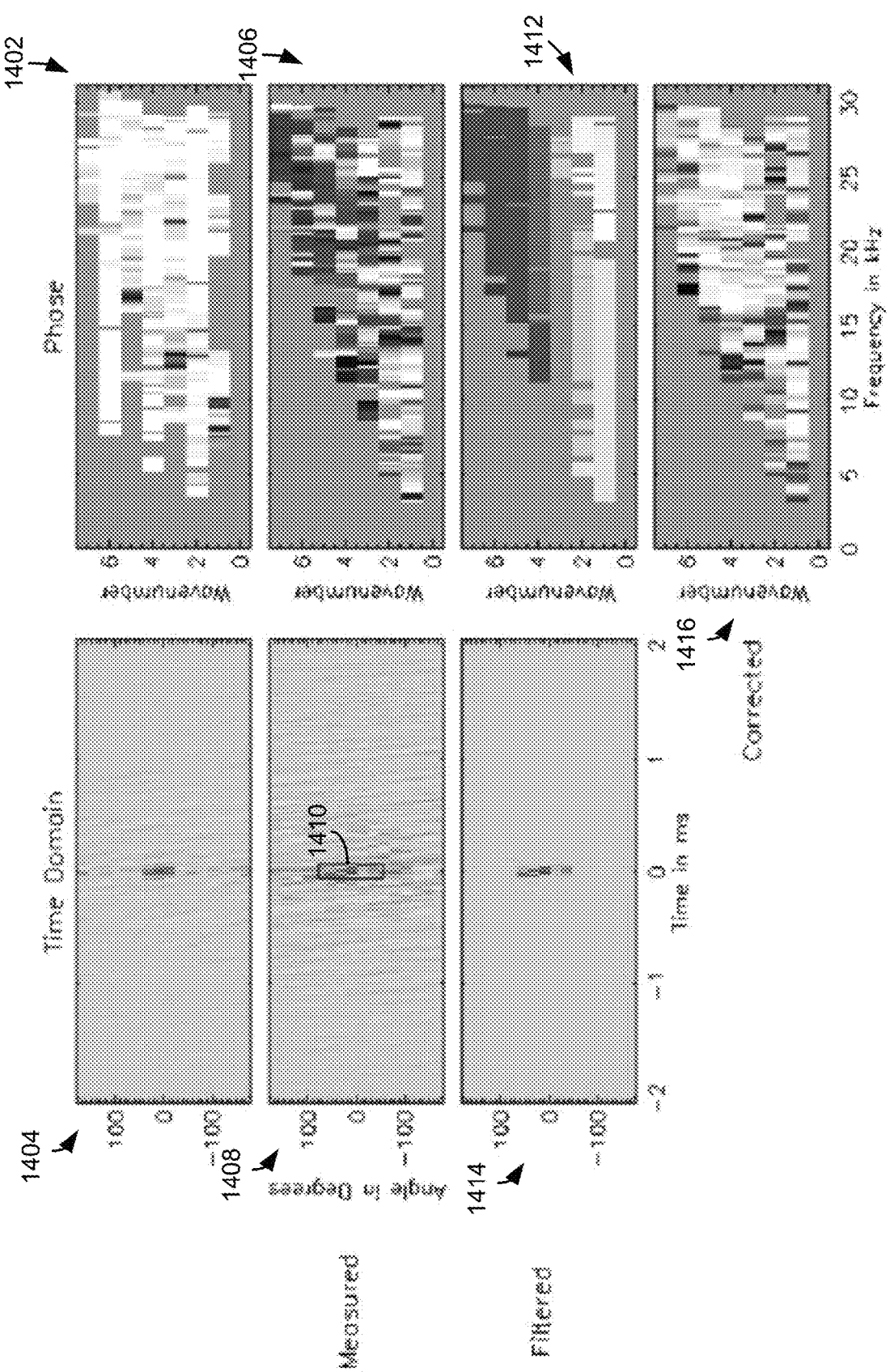
FIG. 14 illustrates phase correction techniques for generation of symmetry invariant logs, in accordance with certain aspects of the present disclosure.

FIG. 14 illustrates example techniques for phase correction, in accordance with certain aspects of the present disclosure. Plot 1402 shows a symmetry invariant having a white (e.g., around 0° phase) overall color in the frequency domain. The plot 1402 may be converted to the time domain using an inverse Fourier transform for which the result is shown in plot 1404. Almost all the signal is concentrated into a small region near the center of plot 1404, as shown. Plot 1406 shows results of measurements via acoustic logging tool 100 in the frequency domain and plot 1408 shows results of measurements via acoustic logging tool 100 in the time domain. As shown, the measured signal is more widely scattered.

The data 1410 around the center of plot 1408 may be extracted and filtered to generate the filtered result as shown in plots 1412, 1414 in the frequency and time domains, respectively. For example, the measured data 1410 shown in plot 1408 may be low pass filtered. Thus, the phase in plot 1412 is a blurred version of the original measured data (e.g., due to the low-pass filter). Subtracting the filtered phase from the original measured phase shows in plot 1406 provides the corrected measurement signal shown in plot 1416. The corrected phase shows many modes in white as expected but there are still far more colors (phase variations) than predicted. This is because the true system has many other asymmetries such as elements which are not exactly matched.

In certain aspects, the acoustic logging tool 100 can log the geometry, namely eccentricity and orientation of the production tube inside the casing. Convolution is an accurate method of finding the symmetry axis. But the orientation of that axis (e.g., which way is the production tube offset) and its eccentricity are more challenging to identify. Eccentricity can be determined from a region of F4 where spectral lines decrease in frequency as eccentricity increases. A spectral line is a resonance of the system and decreasing frequency means getting a softer spectral line. So concentricity, with a C spacer, makes the system act like hard material. Changing to F, D, then E makes the spectral line softer. C, D, E, and F spacers are different spacers resulting in different eccentricities, as described.

Eccentricity could be read directly from F4 and works for all test rigs at all measured eccentricities and orientations, including rig 3, confirming that it is not affected by impedance. However, as shown in FIG. 15, the spectral lines change not just with eccentricity but also with temperature.

Figure 15:
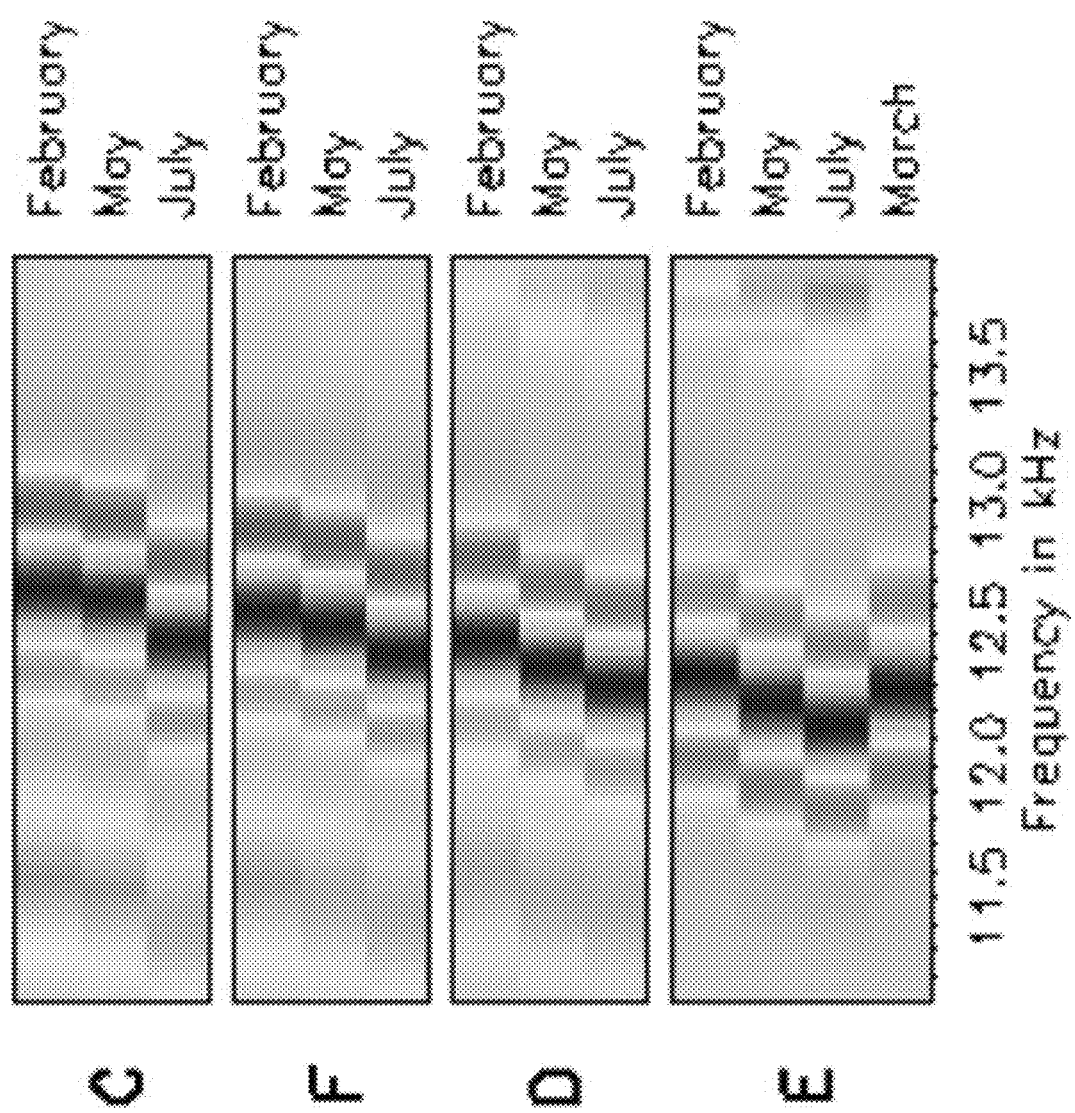
FIG. 15 illustrates symmetry invariant logs associated with different temperatures during sensing, in accordance with certain aspects of the present disclosure.

FIG. 15 shows measurements results taken during different months at different temperatures. A decrease in frequency, without changing the geometry, is shown as a result of changing temperatures, implying a lower sound velocity at higher temperature. The trend of sound velocity is opposite to that of water, where the velocity increases with temperature in oil. Moreover, high pressure increases the sound velocity in oil which is the same trend as in water.

Figure 16:
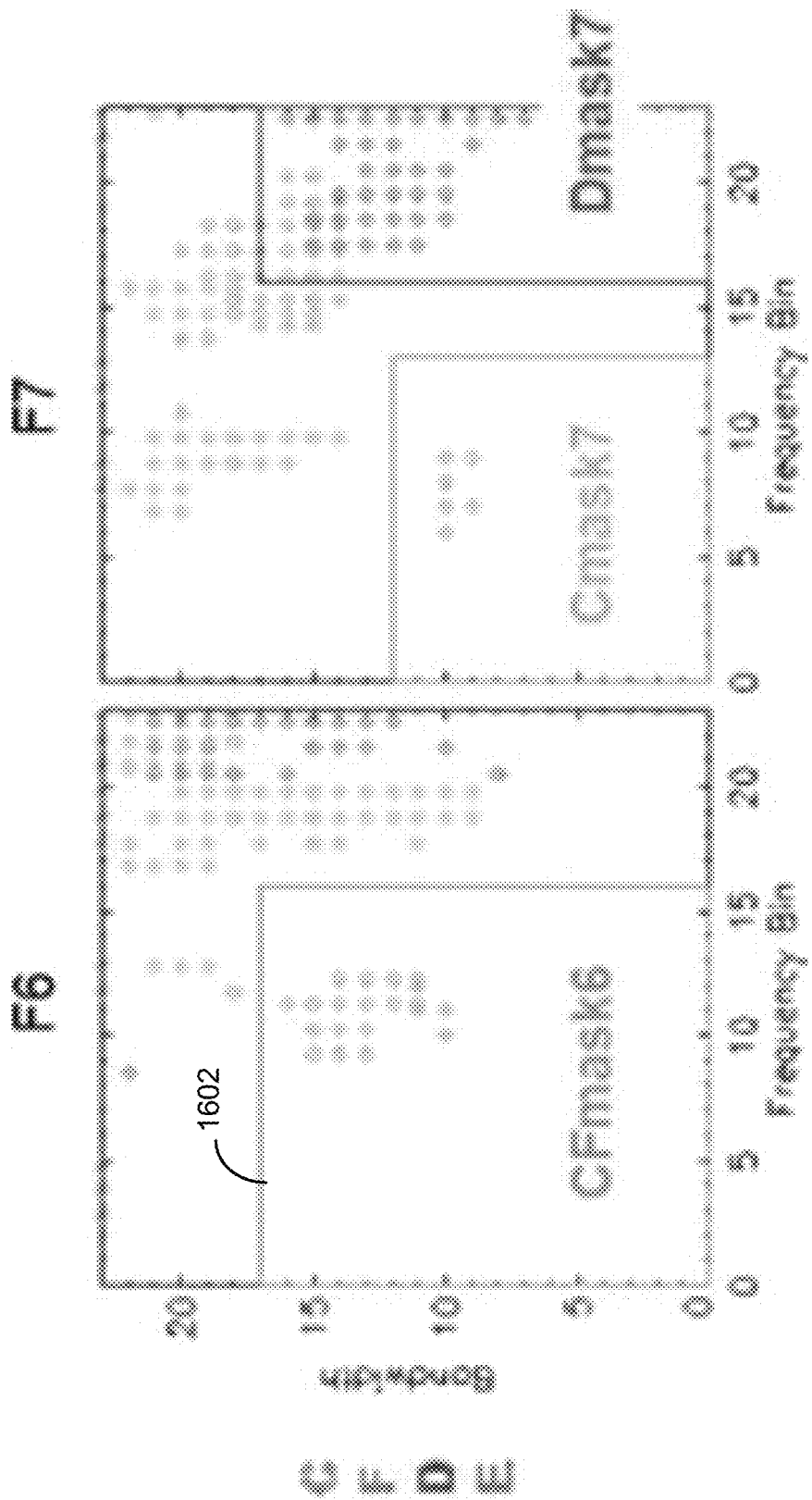
FIG. 16 illustrates bandwidth associated with acoustic wave measurements plotted as a function of resonant frequency, in accordance with certain aspects of the present disclosure.
Figure 17:
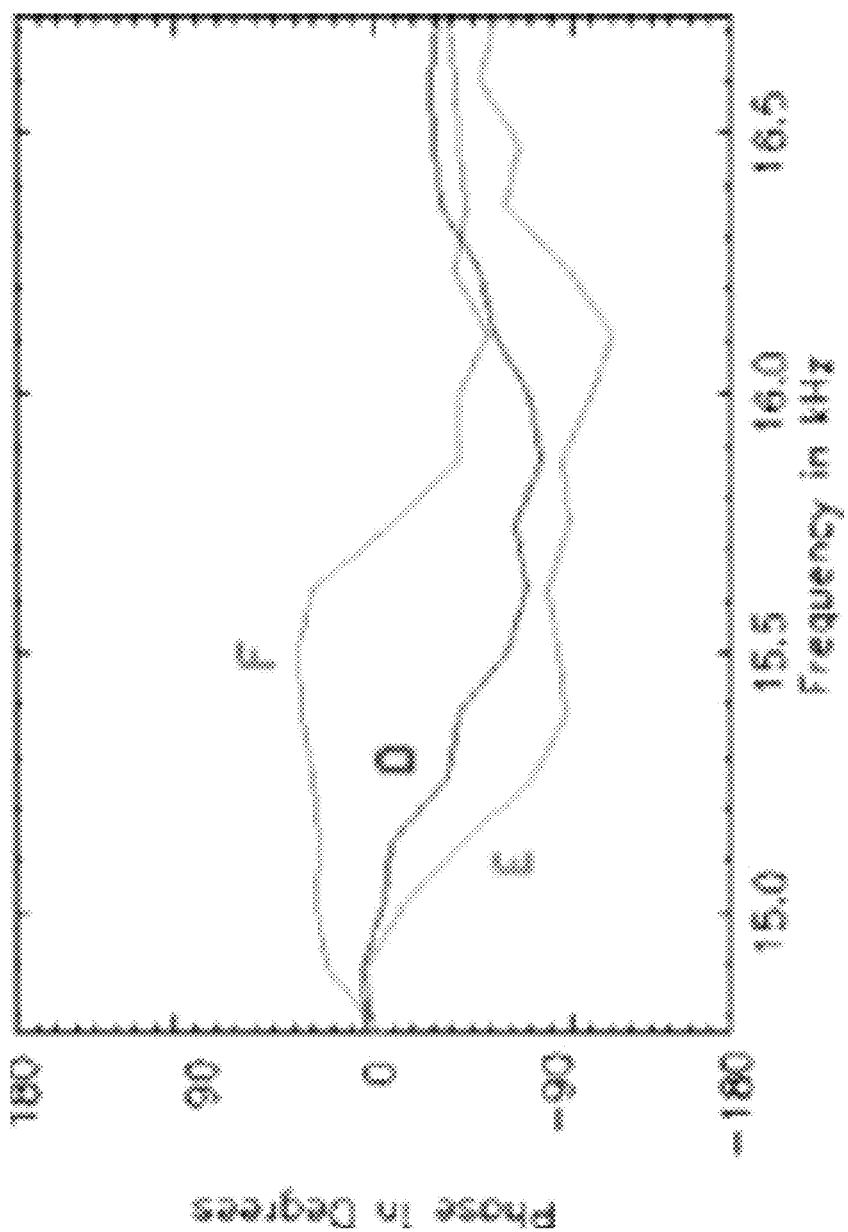
FIG. 17 illustrates phase reference measurements associated with different sensor orientations, in accordance with certain aspects of the present disclosure.

A particular spectral line in F7 may always be sharp (e.g., has a narrow bandwidth) when concentric, which is a typical feature of a hard material. This on its own identifies the C spacer but cannot distinguish between the others because their characteristics overlap. For example, a separation line may exist in F6 where C and F spacers are plotted separately from D and E spacers. As shown in FIG. 16, regions called masks (e.g., mask 1602 for F6) are outlined and applying them allows any eccentricity to be identified due to the separation of measurements associated the spacers, as described. Having found eccentricity, the orientation can then be determined using a phase calculation. For example, in a rig (e.g., having a known orientation), acoustic logging tool 100 may transmit from the closest element where the production tube is closest to the casing, then transmit from the furthest element, which is the one opposite to the closest element. The phase of measured results may be plotted for the furthest element to the measurement results for the closest element, as shown in FIG. 17. This may be used for a narrow frequency range (e.g., at wavenumber 5) and can be used as reference for comparison because the orientation associated with the rig is known.

In some cases, two transmissions may be on an axis (e.g., an axis found from convolution). If their phase is equal to a reference phase, then the chosen order may be starting with the closest element then the farthest element. Alternatively, for a phase that is 180° from the reference phase, the order may be starting with the farthest element then the closest element. FIG. 17 is plotted for three eccentricities (associated with spacers E, D, and F) but the curves are close enough that even an incorrect eccentricity assumption may give the correct answer for isolation detection.

Figure 18:
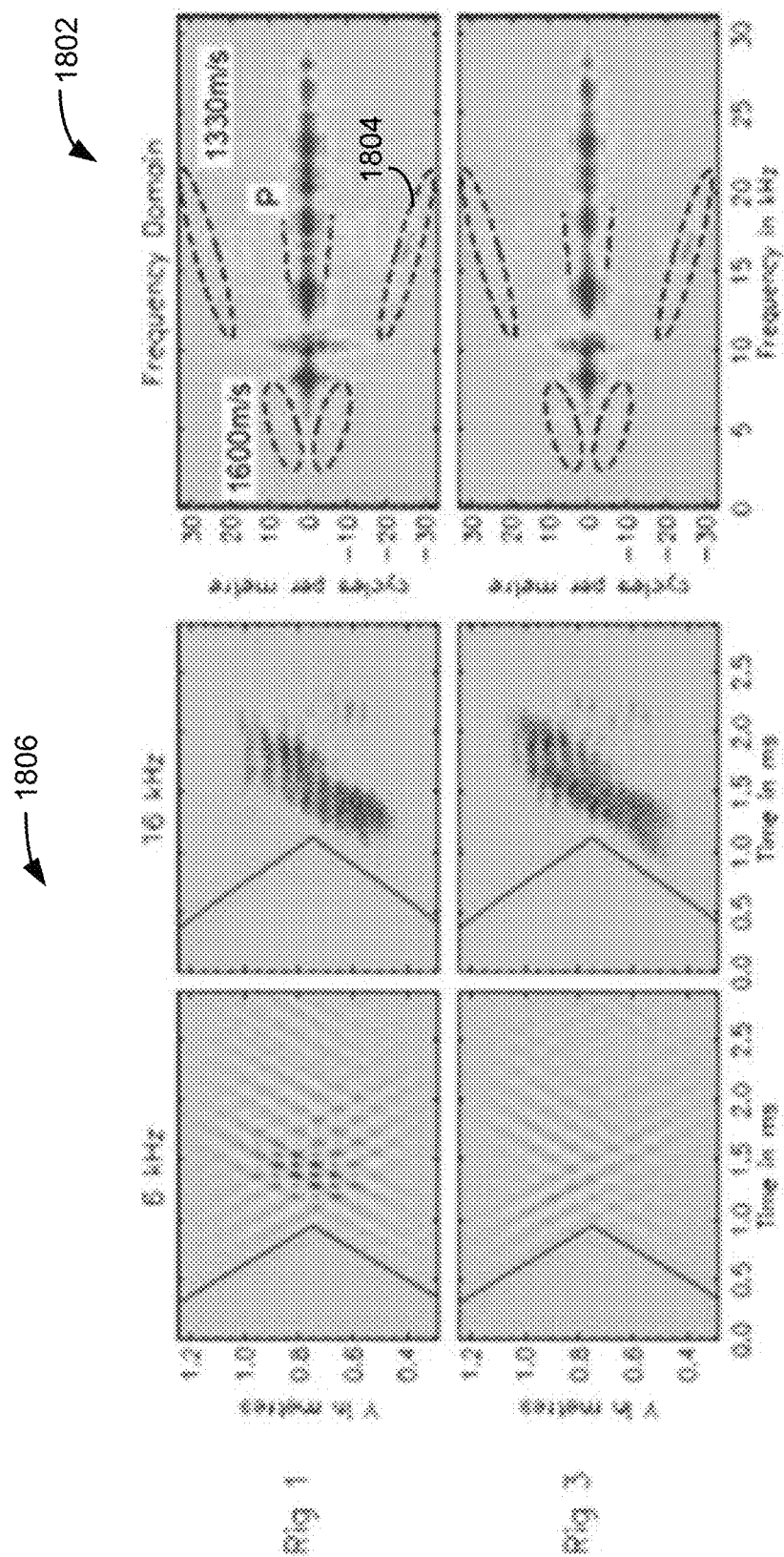
FIG. 18 illustrates chevron measurements in accordance with certain aspects of the present disclosure.

Each stave of a sensor may have ten ceramics wired in parallel. Their sizes are hanning-weighted to reduce axial waves so that only those travelling around the production tube and casing are detectable. In practice there is slight axial sensitivity so collars on the production tube and casing give chevrons in the same way as for an axial sensor. Having ceramics wired in parallel means that no direct velocity filter can be applied (e.g., as it would use separate outputs) but a position filter on its own is adequate. In some cases, the sampling may be a step size of 15 mm which gives the results shown in FIG. 18. Frequency plots 1802 show radial modes as a red central band. Only two of the modes propagate axially. They are the oval-ringed diagonal features (e.g., feature 1804), as shown. As shown by time domain plots 1806, converting to the time domain shows clear chevrons at 6 kHz and 16 KHz; their chevron guides (solid black lines) indicate velocities of 1600 m/s and 1330 m/s with wavelengths 270 mm and 83 mm respectively. Hence, they are Rayleigh waves and/or Lamb waves. Also, P-waves at 5400 m/s indicated by "P" on the frequency plots are also visible. They can be used to measure impedance but are not clearly resolved because the radial test rigs only provide 0.75 m of data which is too short. At 6 KHz, the chevrons are faint in rig 3 compared with rig 1 but there is no difference at the higher frequency. This suggests that 6 kHz propagation is in the casing while 16 kHz identifies the production tube.

Figure 19:
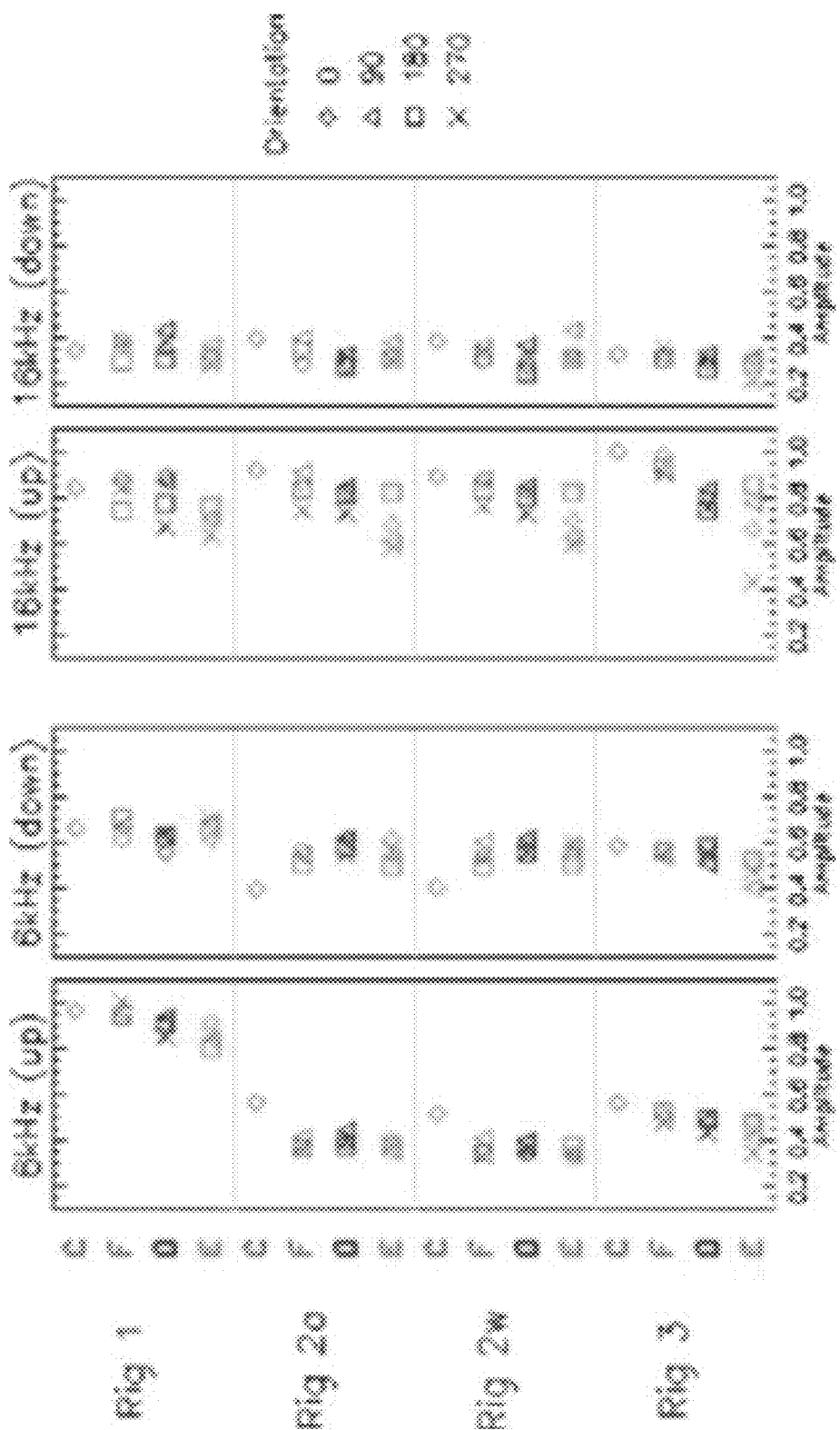
FIG. 19 illustrates chevron amplitudes associated with different rig configurations, in accordance with certain aspects of the present disclosure.

FIG. 19 shows a complete set of amplitudes for comparison of the different rigs. They are divided into waves travelling up (e.g., reflected from the metal base) and down (e.g., reflected from air at the top). There is a contrast between the frequencies. At 16 kHz, all four rigs are similar indicating that propagation is in the production tube. But at 6 kHz, specially for waves travelling up, rig 1 appears different, showing a sensitivity to the formation, implying that the different is due to the casing. The weight of the formation may suppress reflection from the metal base, explaining why rig 2 looks like rig 3, and not like rig 1 as in other results. Thus, chevrons distinguish between production tube and casing collars, an important feature of the logs.

Figure 20:
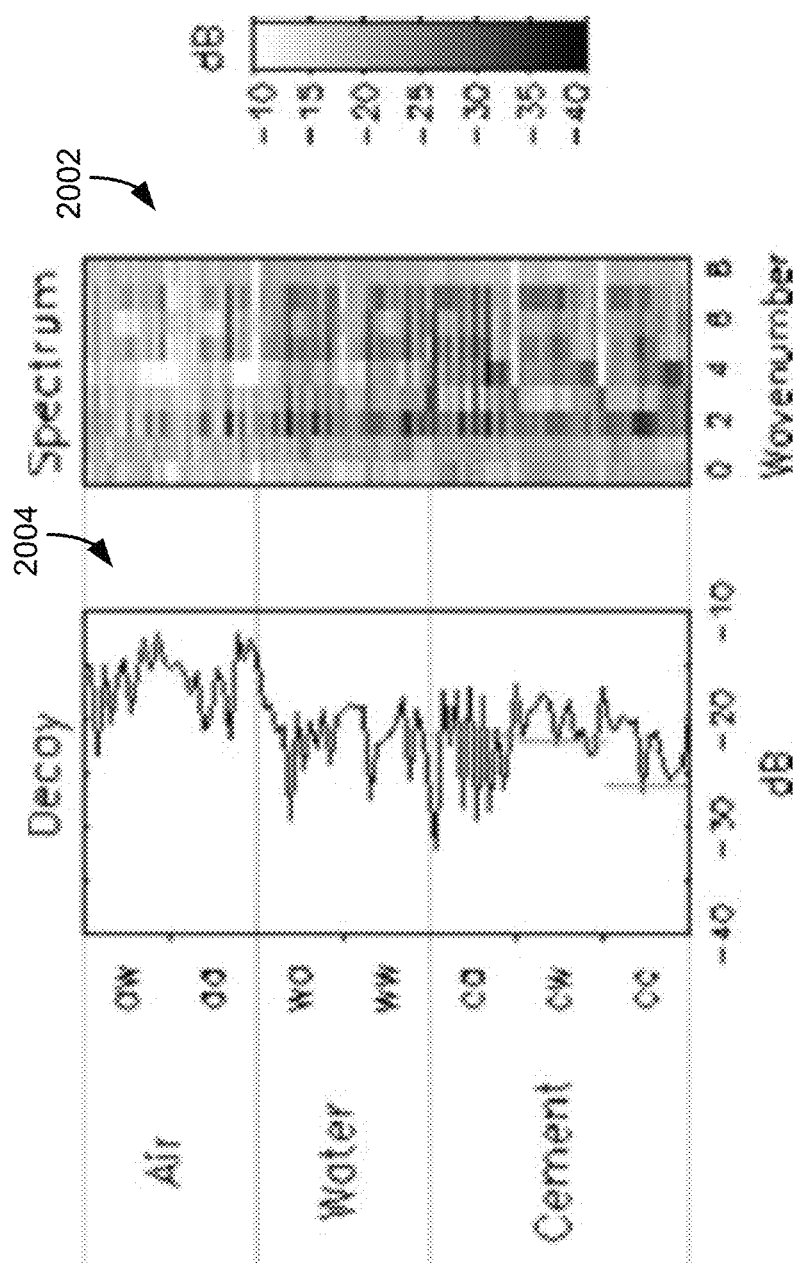
FIG. 20 illustrates decay of radial waves, in accordance with certain aspects of the present disclosure.

FIG. 20 shows decay of radial waves. The decay is shown for measurements with air outside the casing, water held by a plastic pipe, and a cement lining. The cement bond is known to be a good bond (e.g., without cracks). Measured decay of Lamb and/or Rayleigh waves for the three materials is shown. Each individual wavenumber can be plotted separately as shown by the spectrum 2002, or alternatively an overall decay can be plotted as shown by plot 2004, by taking the root mean square (RMS) sum of the wavenumbers. Results were static measurements for all eccentricities (C, F, D and E) at all orientations (0°, 90°, 180°, and 270°). After a temperature drop, with contraction of the metal casing, the bond quality is not known. Thus, three static measurements may be repeated, as shown in green for comparison. As shown, decay has not changed, indicating that the cement remains well bonded to the casing given the temperature drop.

Figure 21:
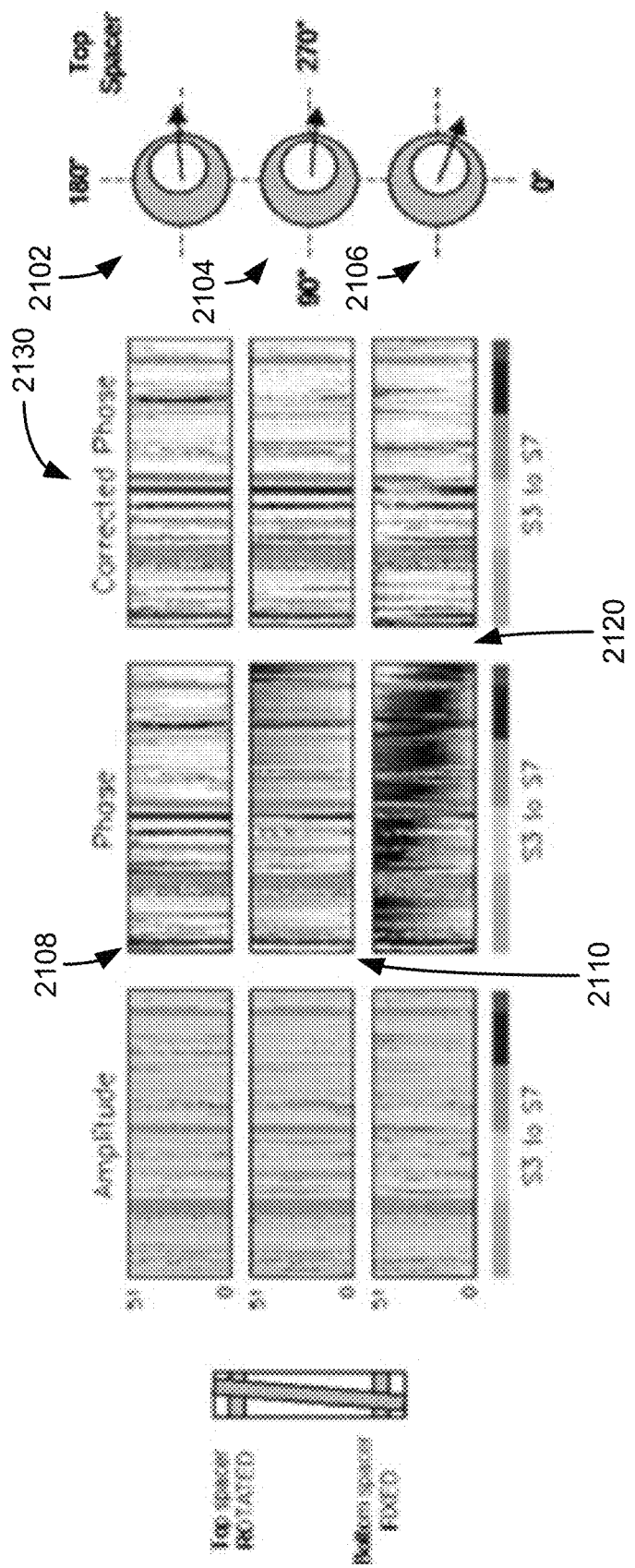
FIG. 21 illustrates symmetry invariant logs for oblique production tube, in accordance with certain aspects of the present disclosure.

FIG. 21 illustrates logs recorded for three oblique geometries. An E spacer (e.g., with high eccentricity) is fixed at 270° at the bottom of the production tube. Then, another E spacer at the top was rotated to three positions close to 270° but slightly offset, as shown by diagrams 2102, 2104, 2106. Hence the geometry is oblique in three slightly different ways. Uncorrected phases show that the measurement shown in diagram 2102 was close to parallel, because the color in the phase diagram 2108 is mainly white. The next was a more oblique configuration (e.g., for diagram 2104) and provides a more pale green phase plot 2110, while the third configuration (e.g., for diagram 2106) provides a rainbow colored phase plot 2120. As shown, phase correction adjusts them all to be more white, as shown by corrected phase plots 2130.

Figure 22:
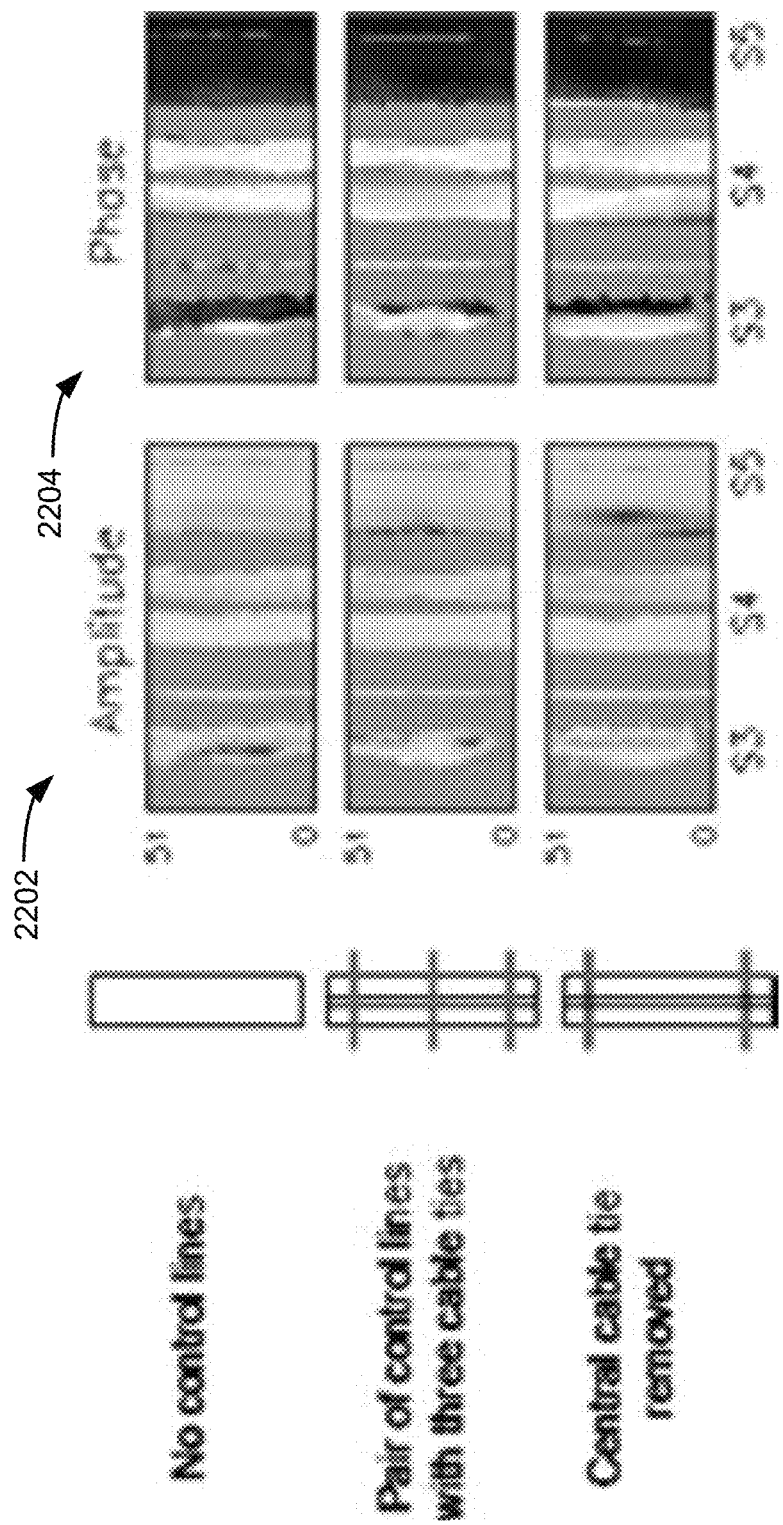
FIG. 22 illustrates symmetry invariant logs for a production having various control lines, in accordance with certain aspects of the present disclosure.

FIG. 22 illustrates amplitude and phase measurements associated with different control line configurations. As shown, one configuration includes control lines, another configuration includes a pair of control lines with three cable ties, and another configuration includes control lines with two cable ties. The control lines are fitted to the outside of the production tube, adding an extra asymmetry. The production tube is at the E45 position (e.g., 45° orientation) inside the casing. Based on the measurements shown in the amplitude and phase plot 2202, 2204, it is determined that the symmetry invariant is highly sensitive for odd wavenumbers (e.g., S3 and S5), but S4 is not disturbed by the control lines.

Figure 23A:
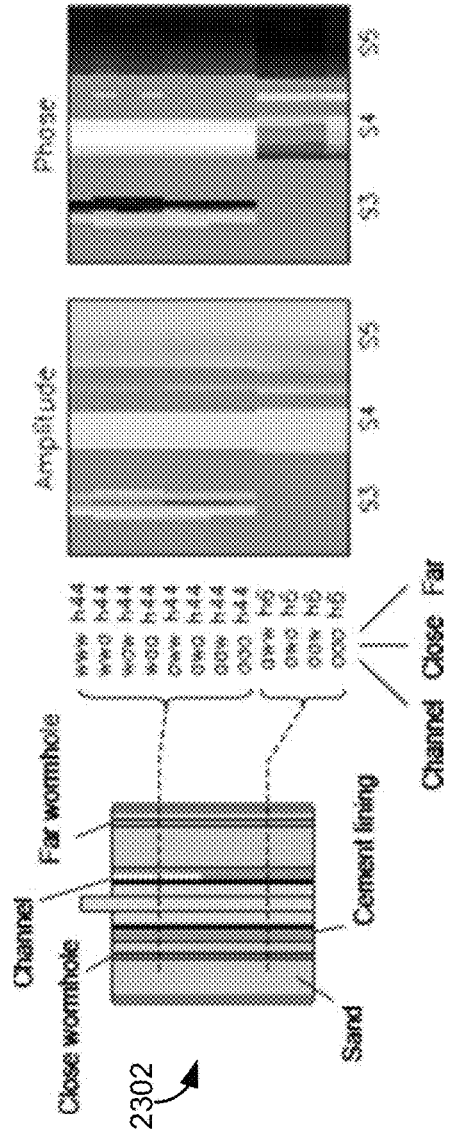
FIGS. 23A and 23B illustrate symmetry invariant logs for a rig having wormholes in sand and cement, respectively, in accordance with certain aspects of the present disclosure.
Figure 23B:
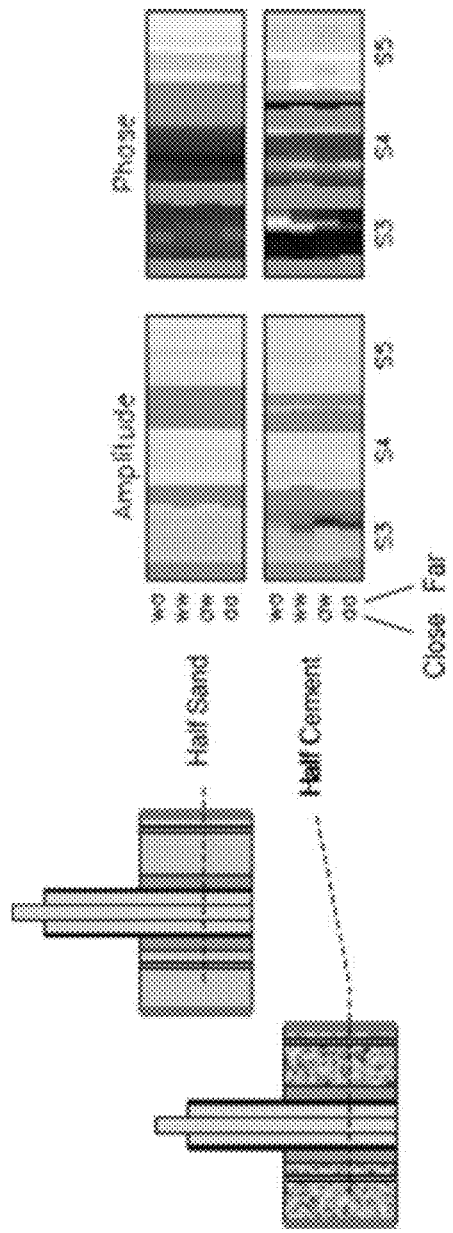

FIGS. 23A and 23B illustrate symmetry invariants with wormholes in sand and cement. A channel in the cement lining is retained and two plastic pipes called wormholes are added as targets, one close to the casing, the other far away, as shown by diagram 2302 of FIG. 23A. A concrete sewer pipe is filled with damp sand. Twelve static measurements are recorded and shown. The first four include the sensor placed near the bottom (e.g., labeled as hole "h6") where there is no channel, followed by eight measurements near the top (e.g., e.g., labeled as hole "h44"). In this manner, all combinations of air (labeled "a") and water (labeled "w") in the channel and wormholes are included. Presence or absence of the channel is indicated in the plot for S3 (e.g., filling of air or water can even be seen), however, the wormholes are not indicated by the plot for S3.

Figure 24:
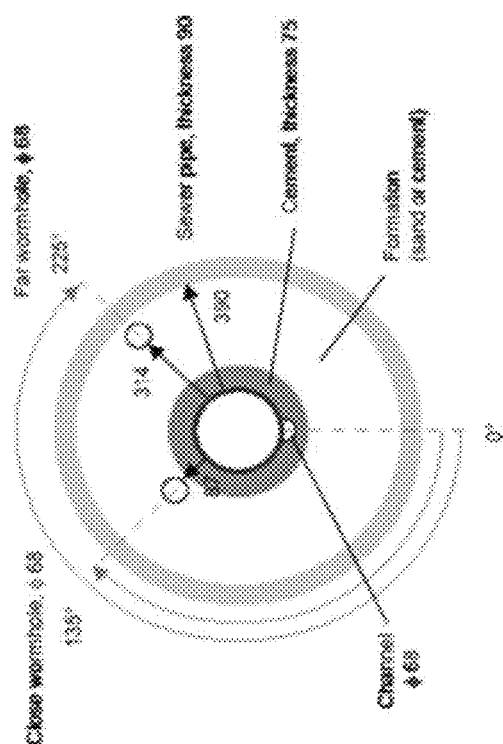
FIG. 24 is a top view of a radial rig, in accordance with certain aspects of the present disclosure.
Figure 25:
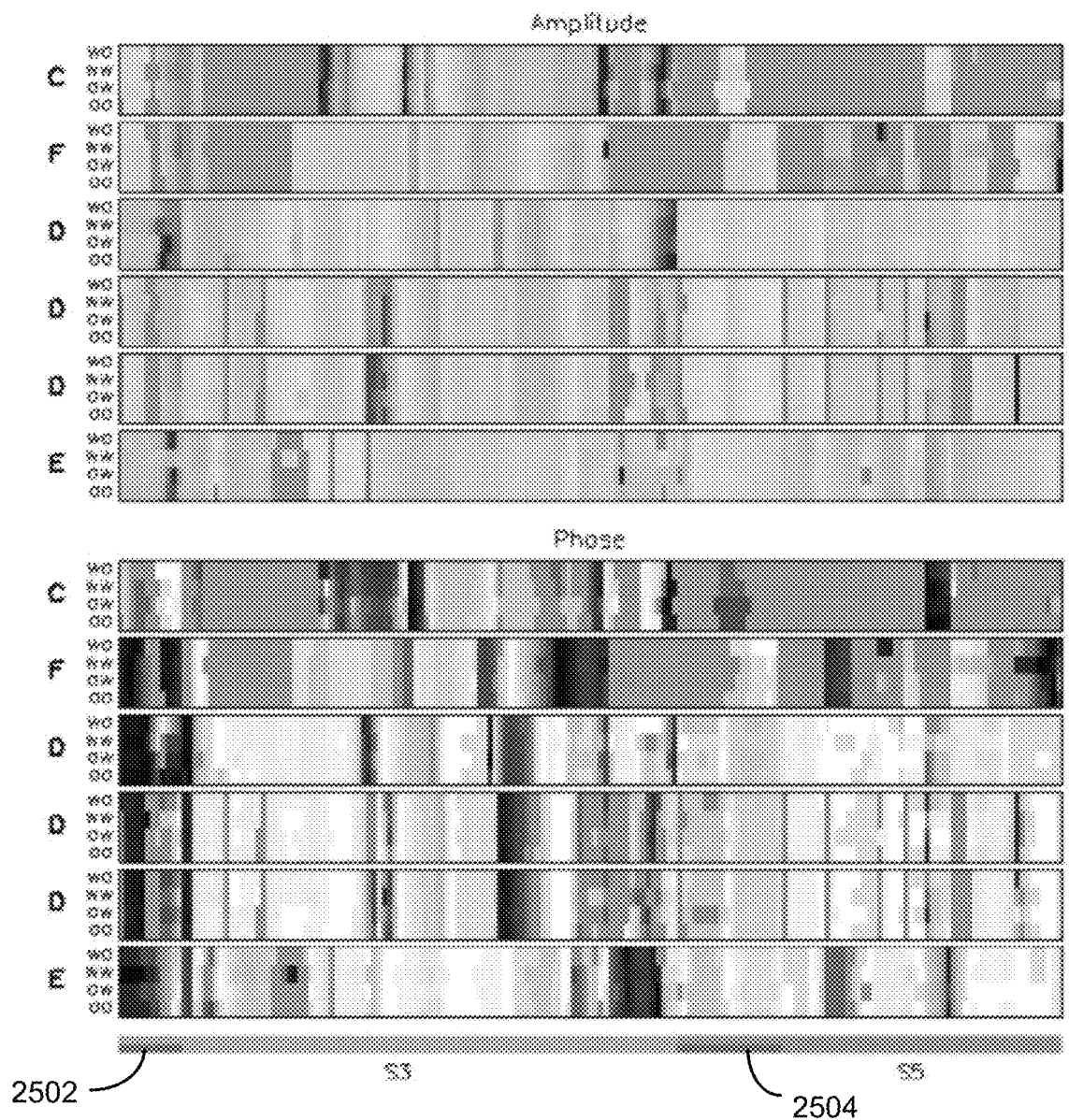
FIG. 25 illustrates symmetry invariant logs for a rig having wormholes in cement, in accordance with certain aspects of the present disclosure.

As shown in FIG. 23B, two formations are tested including saturated sand and hard cement, both with the same wormholes as used to obtain the measurements shown in FIG. 23A. The sand and cement are only constructed halfway up the rig. There was is little penetration of waves into the sand. But the formation made of hard cement reveals differences between all four combinations of air and water in the wormholes, confirming Rayleigh wave penetration. The penetration depth can be estimated from FIG. 24 which shows angular positions of the wormholes and distances to their inner edges. Wormhole measurements in FIG. 23B are recorded after pouring the cement. The measurements were repeated on different days using spacer D without moving the sensor. Other three eccentricities were also recorded. All results are shown in FIG. 25 as full spectrums of S3 and S5 with different spacers (e.g., eccentricities) and with different combinations of air and water in the channel. Grey bars 2502, 2504 indicate the selected frequencies (e.g., the portion of the full spectrum that may be used for isolation detection).

Figure 26:
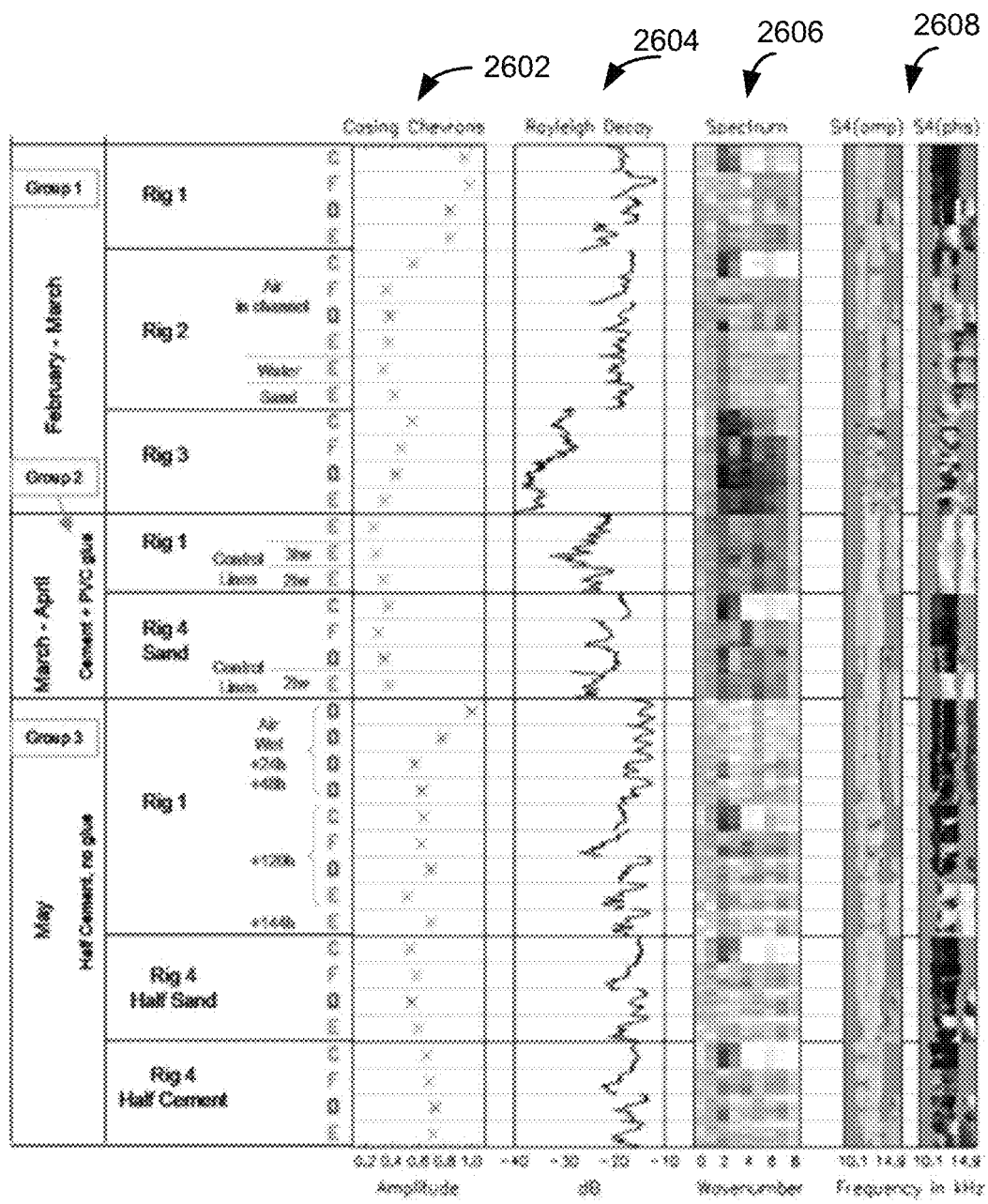
FIG. 26 illustrates logs of Rayleigh wave characteristics, in accordance with certain aspects of the present disclosure.

FIG. 26 provides plots of measurements performed at different times referred to as group 1 (e.g., February to March), group 2 (e.g., March to April), and group 3 (e.g., May). All data is from logs of 51 steps with different colors to indicate different eccentricities associated with different spacers. Column 2602 shows the chevron amplitudes plotted for axial waves travelling upwards (e.g., reflected from the metal base) at 6 kHz, interpreted as being in the casing. Columns 2604, 2606 are plots of measurements to show radial wave decay. Also shown are the amplitude and phase of a symmetry invariant S4 (labeled S4(amp) and S4(phs)) (e.g., log 2608). Chevrons in group 1 show low amplitudes for rigs 2 and 3, interpreted as being due to reflections from the base that are suppressed by the weight of the formation. The measurement for rig 1 of group 2, although having no formation, also shows low amplitude, which may be caused by absorption in the soft cement lining. Adding sand as a formation has not shown to reduce the amplitude any further. Amplitude in group 3 starts high with air then decreases for the wet cement lining. Both are fluids so these are actually Lamb waves. There is a further decrease as the cement cures to a solid, giving Rayleigh waves. Its final value remains significantly higher than in group 2, indicating absorption in soft cement. Adding a sand or cement formation may not make a difference. The Rayleigh decay and spectrum is different for Rig 3, as it has greater decay and is the only one where S4 shows variations (e.g., is not continuous). Therefore, the rapid decay may be caused by discontinuities breaking up of the Rayleigh waves. This contrasts with P-waves since for axial P-waves, decay is caused by high impedance, and for radial Rayleigh waves, decay is caused by local discontinuities. Group 2 also has greater decay than group 3 showing that absorption in the soft cement applies to radial as well as axial Rayleigh waves.

Changes in eccentricity also results in distinctions. For example, all the C spacers show a black band (e.g., rapid decay) at wavenumber 2 but are brighter at higher wavenumbers. Their overall decay is similar to other eccentricities, so this is not a problem for log interpretation, and is a way of recognizing concentricity in addition to the narrow bandwidth referred to herein.

Another notable feature is that a control line central tie wrap (e.g., for group 2, rig 1) also gives rapid decay even though it is not in contact with the casing. Local discontinuities therefore include the production tube. This has relevance to corrosion, however, S4 remains unaffected as described.

Figure 27:
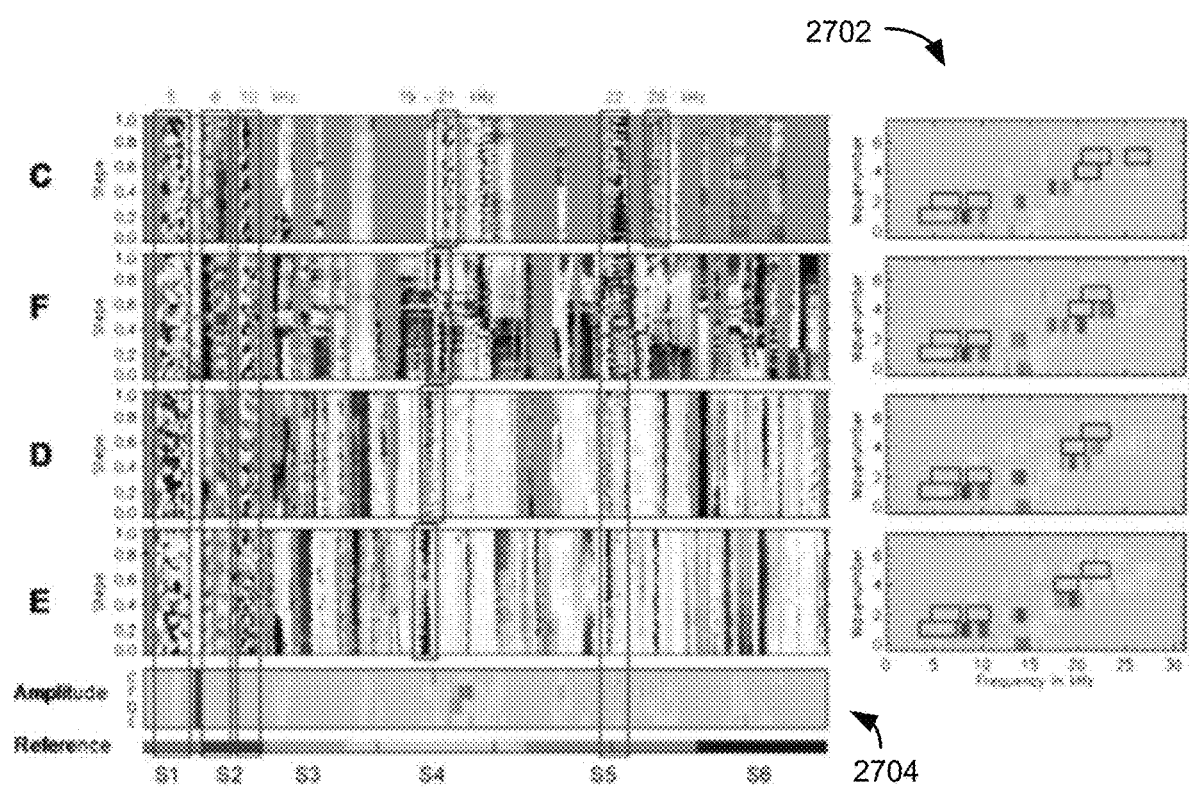
FIG. 27 illustrates interference between axial and radial modes, in accordance with certain aspects of the present disclosure.

FIG. 27 shows a full spectra of measurement data. Data is from rig 1 with no formation for which smooth logs would be expected. As shown, certain frequencies show variation which is not irregular as seen in rig 3 but instead has repeated patterns, which may be caused by interference. Repeated patterns occur for modes which propagate both axially and radially. As shown, areas outlined in dark blue are modes which are always the same. Areas outlined in red change with eccentricity. In particular, the interference in S4 changes by 2 kHz between spacers C and E, and thus, may be used to find eccentricity without temperature dependence.

Air and metal at the top and bottom of the radial rigs act as strong reflectors for axial waves. In a well, the collars may not reflect strongly. Frequency plots 2702 and their amplitude plot 2704 show that interference (e.g., shown by the dark blue and red boxes) happens in modes which are faint. Thus, such modes may be undetectable.

The acoustic logging tool 100 described herein allows classification of materials bonded to the casing from within the production tube and detection of the presence of structural features in high impedance materials that eliminate (or reduce) its potential to provide isolation. Certain aspects blend and balance a variety of complex technologies and processing techniques, such as multi-element arrays, beamforming, swept frequency transduction, convolution, frequency domain analysis, as well as forward and reverse acoustic waves with an associated symmetry invariant analysis.

The MCBL radial tool provided herein provides reliable determination of impedance of materials beyond the casing from within the production tube. In addition to this, the behavior of symmetry invariant informs whether the material is free from features that would compromise its ability to support isolation. Rules of isolation determination are provided which is insensitive to eccentricity and orientation. Impedance and S4 logging/presentation form the basis of a low risk development path for a viable downhole tool. The determination of S4 from the full spectrum may use a small portion of the full spectrum. The full spectrum that is also available and contains information which maybe further processed to enable the same tool to map individual features, as described.

Figure 28:
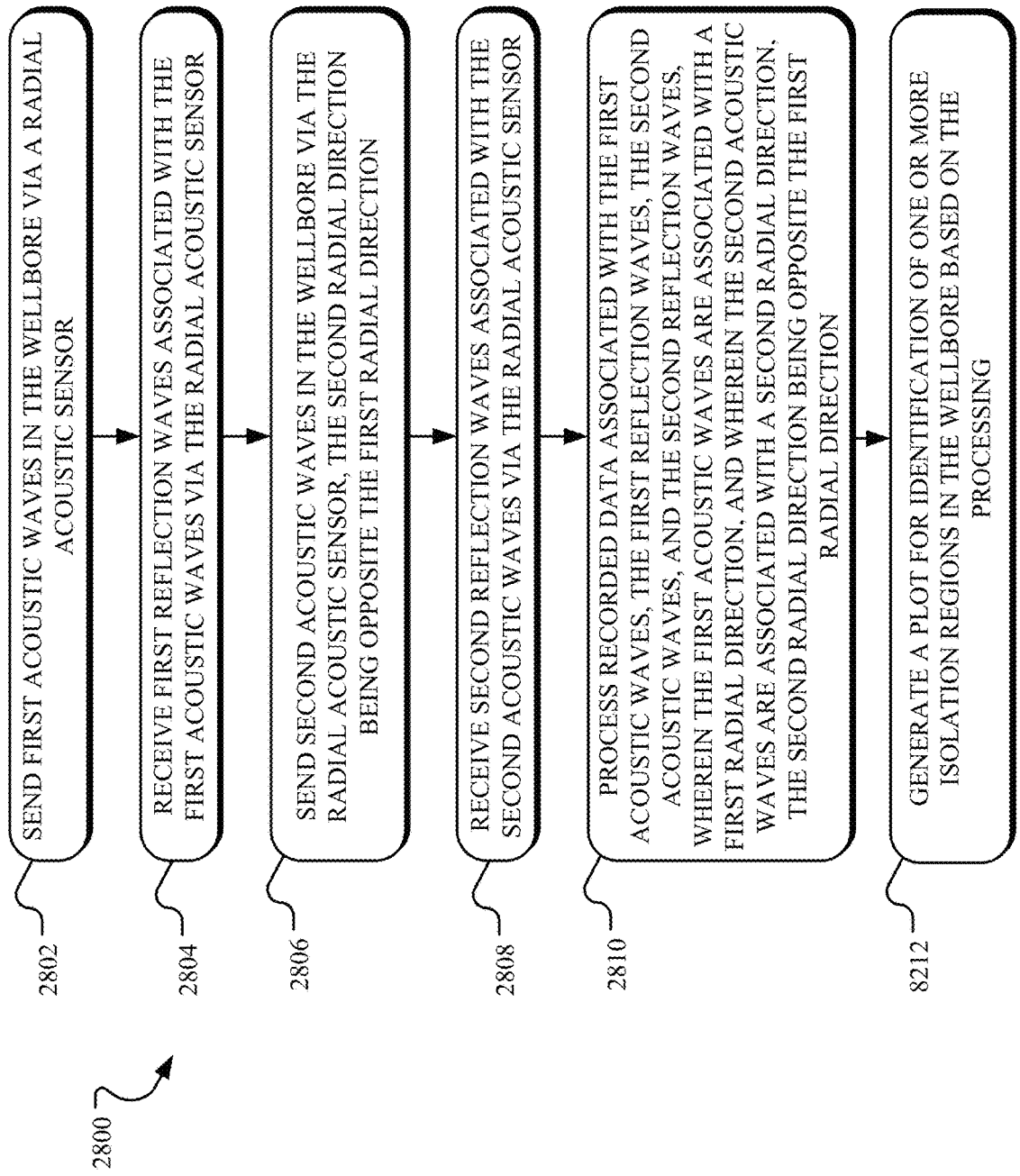
FIG. 28 is a flow diagram illustrating example operations for isolation detection in a wellbore, in accordance with certain aspects of the present disclosure.

FIG. 28 is a flow diagram illustrating example operations 2800 for isolation detection in a wellbore, in accordance with certain aspects of the present disclosure. The operations 2800 may be performed, for example, by an isolation detection system, which may include controller 103, and in some aspects, the acoustic logging tool 100.

At block 2802, the isolation detection system sends first acoustic waves (e.g., forward wave 702) in the wellbore via a radial acoustic sensor (e.g., radial sensor 102). At block 2804, the isolation detection system receives first reflection waves (e.g., forward wave reflection 704) associated with the first acoustic wave via the radial acoustic sensor. The first acoustic waves may be sent by a plurality of staves (e.g., staves 138). Each of the first reflection waves may be received by the plurality of staves at a time between two of the first acoustic waves being sent At block 2806, the isolation detection system sends second acoustic waves (e.g., reverse acoustic wave 706) in the wellbore via the radial acoustic sensor. At block 2808, the isolation detection system receives second reflection waves (e.g., reverse wave reflection 708) associated with the second wave via the radial acoustic sensor.

At block 2810, the isolation detection system processes recorded data associated with the first acoustic waves, the first reflection waves, the second acoustic waves, and the second reflection waves. The first acoustic waves may be associated with a first radial direction, and wherein the second acoustic waves are associated with a second radial direction, the second radial direction being opposite the first radial direction. At block 2812, the isolation detection system generates a plot (e.g., the symmetry invariant log 802) for feature identification associated with the wellbore based on the processing at block 2810. For example, the plot may be used to identify one or more isolation regions in the wellbore.

In some aspects, the isolation detection system determines a first ratio between a parameter (e.g., Er) associated with the first reflection waves and a parameter (e.g., Ef) associated with the first acoustic waves. The isolation detection system may also determine a second ratio between a parameter (e.g., Bf) associated with the second acoustic waves and a parameter associated with the second reflection waves (e.g., Br). The one or more isolation regions may be identified based on the first ratio and the second ratio. For example, the one or more isolation regions may be determined by perform a division of the first ratio and the second ratio.

In some aspects, the plot includes a parameter associated with dividing the first ratio and the second ratio for each of multiple acoustic wave measurements in the wellbore, and the one or more isolation regions are identified based on an amount of variation associated with the plot (e.g., as shown by symmetry invariant log 802). The parameters associated with the first acoustic waves, the first reflection waves, the second acoustic waves, and the second reflection waves may be amplitude parameters, in some aspects. In some aspects, the parameters associated with the first acoustic waves, the first reflection waves, the second acoustic waves, and the second reflection waves may be phase parameters.

In some aspects, the recorded data may be converted from the time domain to the frequency domain, and the one or more isolation regions may be identified based on the recorded in the frequency domain. For example, the one or more isolation regions may be identified based on one of a plurality of wavenumbers (e.g., wavenumber 4) associated with the recorded data.

In some aspects, sending the first acoustic waves may include sending an acoustic wave via a first one of a plurality of staves (e.g., staves 138) arranged about a circumference of the radial acoustic sensor (e.g., radial sensor 102), and sending another acoustic wave via a second one of the plurality of staves that is adjacent to the first one of the plurality of staves. Sending the second acoustic waves may include sending an acoustic wave via the first one of the plurality of staves, and sending another acoustic wave via a third one of the plurality of staves that is adjacent to the first one of the plurality of staves. In some aspects, each of the one or more isolation regions corresponds to an area of bonded cement free from anomalies and adapted for plug and abandon of the wellbore.

Figure 29:
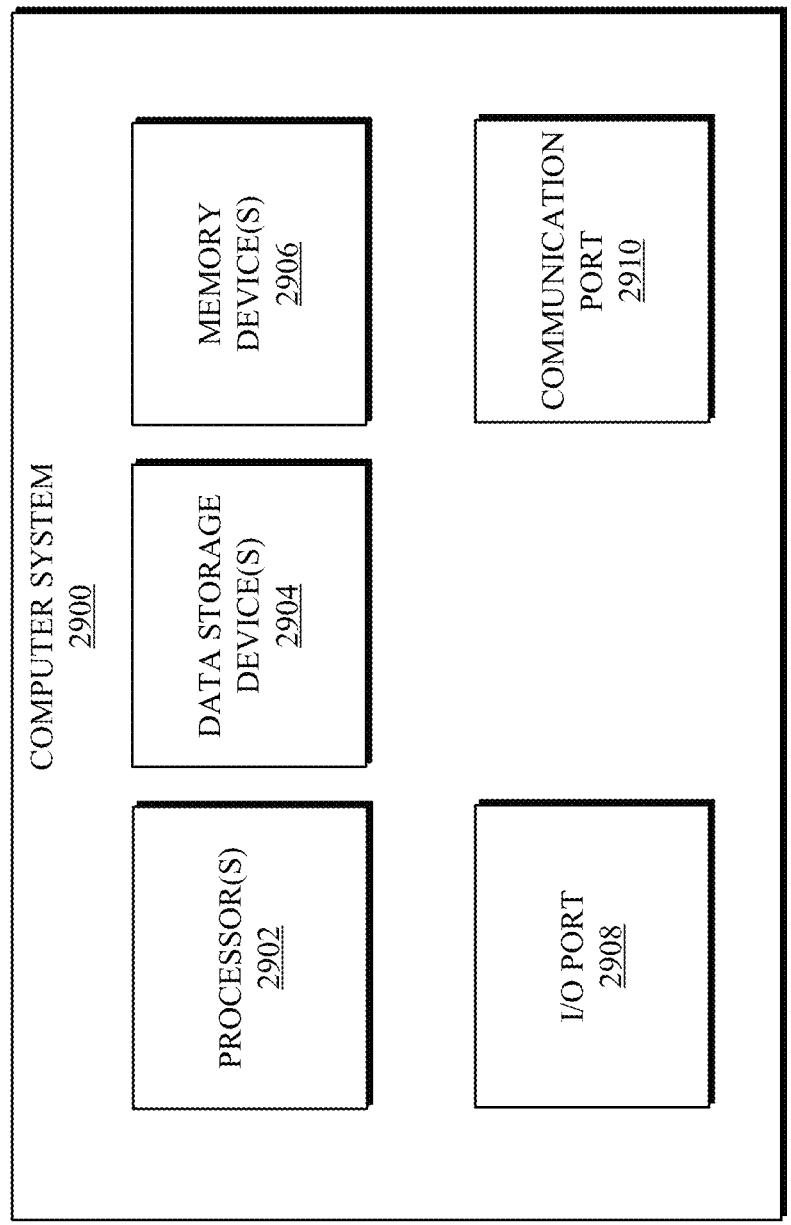
FIG. 29 depicts an example computing system that may implement various systems and methods discussed herein.

FIG. 29 provides an example computing system 2900 having one or more computing units that may implement various systems and methods discussed herein. The computing system 2900 may be applied to the controller 103, data recorder, and/or the like and may be used in connection with processing. It will be appreciated that specific implementations of these devices may be of differing possible specific computing architectures not all of which are specifically discussed herein but will be understood by those of ordinary skill in the art.

The computing system 2900 may be a computing system is capable of executing a computer program product to execute a computer process. Data and program files may be input to the computing system 2900, which reads the files and executes the programs therein. Some of the elements of the computing system 2900 are shown in FIG. 29, including one or more hardware processors 2902, one or more data storage devices 2904, one or more memory devices 2908, and/or one or more ports 2908-2910. Additionally, other elements that will be recognized by those skilled in the art may be included in the computing system 2900 but are not explicitly depicted in FIG. 29 or discussed further herein. Various elements of the computing system 2900 may communicate with one another by way of one or more communication buses, point-to-point communication paths, or other communication means not explicitly depicted in FIG. 29.

The processor 2902 may include, for example, a central processing unit (CPU), a microprocessor, a microcontroller, a digital signal processor (DSP), and/or one or more internal levels of cache. There may be one or more processors 2902, such that the processor 2902 comprises a single central-processing unit, or a plurality of processing units capable of executing instructions and performing operations in parallel with each other, commonly referred to as a parallel processing environment.

The computing system 2900 may be a conventional computer, a distributed computer, or any other type of computer, such as one or more external computers made available via a cloud computing architecture. The presently described technology is optionally implemented in software stored on the data stored device(s) 2904, stored on the memory device(s) 2906, and/or communicated via one or more of the ports 2908-2910, thereby transforming the computing system 2900 in FIG. 29 to a special purpose machine for implementing the operations described herein. Examples of the computing system 2900 include personal computers, terminals, workstations, mobile phones, tablets, laptops, personal computers, multimedia consoles, gaming consoles, set top boxes, and the like.

The one or more data storage devices 2904 may include any non-volatile data storage device capable of storing data generated or employed within the computing system 2900, such as computer executable instructions for performing a computer process, which may include instructions of both application programs and an operating system (OS) that manages the various components of the computing system 2900. The data storage devices 2904 may include, without limitation, magnetic disk drives, optical disk drives, solid state drives (SSDs), flash drives, and the like. The data storage devices 2904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 2906 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 2904 and/or the memory devices 2906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing system 2900 includes one or more ports, such as an input/output (I/O) port 2908 and a communication port 2910, for communicating with other computing, network, or vehicle devices. It will be appreciated that the ports 2908-2910 may be combined or separate and that more or fewer ports may be included in the computing system 2900.

The I/O port 2908 may be connected to an I/O device, or other device, by which information is input to or output from the computing system 2900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 2900 via the I/O port 2908. Similarly, the output devices may convert electrical signals received from computing system 2900 via the I/O port 2908 into signals that may be sensed as output by a human, such as sound, light, and/or touch. The input device may be an alphanumeric input device, including alphanumeric and other keys for communicating information and/or command selections to the processor 2902 via the I/O port 2908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 2900 via the I/O port 2908. For example, an electrical signal generated within the computing system 2900 may be converted to another type of signal, and/or vice-versa. In one implementation, the environment transducer devices sense characteristics or aspects of an environment local to or remote from the computing system 2900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing system 2900, such as, physical movement of some object (e.g., a mechanical actuator), heating or cooling of a substance, adding a chemical substance, and/or the like.

In one implementation, a communication port 2910 is connected to a network by way of which the computing system 2900 may receive network data useful in executing the methods and systems set out herein as well as transmitting information and network configuration changes determined thereby. Stated differently, the communication port 2910 connects the computing system 2900 to one or more communication interface devices configured to transmit and/or receive information between the computing system 2900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 2910 to communicate one or more other machines, either directly over a point-to-point communication path, over a wide area network (WAN) (e.g., the Internet), over a local area network (LAN), over a cellular (e.g., third generation (3G), fourth generation (4G), or fifth generation (5G)) network, or over another communication means. Further, the communication port 2910 may communicate with an antenna or other link for electromagnetic signal transmission and/or reception.

In an example implementation, radial logs, axial logs, impedance information, spectra, characterizations, and software and other modules and services may be embodied by instructions stored on the data storage devices 2904 and/or the memory devices 2906 and executed by the processor 2902.

The system set forth in FIG. 29 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for isolation detection in a wellbore, comprising:
sending first acoustic waves in the wellbore via a radial acoustic sensor;
receiving first reflection waves associated with the first acoustic waves via the radial acoustic sensor;
sending second acoustic waves in the wellbore via the radial acoustic sensor;
receiving second reflection waves associated with the second acoustic waves via the radial acoustic sensor;
processing recorded data associated with the first acoustic waves, the first reflection waves, the second acoustic waves, and the second reflection waves, wherein the first acoustic waves are associated with a first radial direction, and wherein the second acoustic waves are associated with a second radial direction, the second radial direction being opposite to the first radial direction;
determining a first ratio between a parameter associated with the first reflection waves and a parameter associated with the first acoustic waves;
determining a second ratio between a parameter associated with the second acoustic waves and a parameter associated with the second reflection waves; and
generating a plot for identification of one or more isolation regions in the wellbore based on the processing, wherein the one or more isolation regions are identified based on the first ratio and the second ratio.

2. The method of claim 1, wherein the one or more isolation regions are determined by dividing the first ratio and the second ratio to generate the plot.

3. The method of claim 1, wherein a symmetry invariant parameter is calculated by dividing the first ratio and the second ratio for each of the first and second acoustic waves in the wellbore, and wherein the one or more isolation regions are identified based on an amount of variation associated with the symmetry invariant parameter.

4. The method of claim 1, wherein the parameter of the first acoustic waves, the parameter of the first reflection waves, the parameter of the second acoustic waves, and the parameter of the second reflection waves comprise amplitude parameters.

5. The method of claim 1, wherein the parameter of the first acoustic waves, the parameter of the first reflection waves, the parameter of the second acoustic waves, and the parameter of second reflection waves comprise phase parameters.

6. The method of claim 1, wherein each of the one or more isolation regions corresponds to an area of bonded cement free from anomalies and adapted for plug and abandon of the wellbore.

7. The method of claim 1, wherein the first radial direction is clockwise and the second radial direction is counterclockwise.

8. The method of claim 1, wherein the recorded data is converted from a time domain to a frequency domain, and wherein the one or more isolation regions are identified based on the recorded data in the frequency domain.

9. The method of claim 1, wherein the one or more isolation regions is identified based on one of a plurality of wavenumbers associated with the recorded data.

10. The method of claim 1, wherein sending the first acoustic waves comprises:
sending a first wave via a first one of a plurality of staves arranged about a circumference of the radial acoustic sensor; and
sending a second wave via a second one of the plurality of staves that is adjacent to the first one of the plurality of staves.

11. The method of claim 10, wherein sending the second acoustic waves comprises:
sending a third wave via the first one of the plurality of staves; and
sending a fourth wave via a third one of the plurality of staves that is adjacent to the first one of the plurality of staves.

12. The method of claim 1, wherein the first acoustic waves are sent by a plurality of staves, and wherein each of the first reflection waves is received by the plurality of staves at a time between two of the first acoustic waves being sent.

13. One or more tangible non-transitory computer-readable storage media storing computer-executable instructions for performing a computer process on a computing system, the computer process including:
causing a radial acoustic sensor to send first acoustic waves in a wellbore;
causing the radial acoustic sensor to receive first reflection waves associated with the first acoustic waves;
causing the radial acoustic sensor to send second acoustic waves in the wellbore;
causing the radial acoustic sensor to receive second reflection waves associated with the second acoustic waves;
processing recorded data associated with the first acoustic waves, the first reflection waves, the second acoustic waves, and the second reflection waves, wherein the first acoustic waves are associated with a first radial direction, and wherein the second acoustic waves are associated with a second radial direction, the second radial direction being opposite to the first radial direction;
determining a first ratio between a parameter associated with the first reflection waves and a parameter associated with the first acoustic waves;
determining a second ratio between a parameter associated with the second acoustic waves and a parameter associated with the second reflection waves; and
generating a plot for identification of one or more isolation regions in the wellbore based on the processing, wherein the one or more isolation regions are identified based on the first ratio and the second ratio.

14. A system for isolation detection in a wellbore, comprising:
a radial acoustic sensor configured to:
send first acoustic waves in the wellbore;
receive first reflection waves associated with the first acoustic waves;
send second acoustic waves in the wellbore; and
receive second reflection waves associated with the second acoustic waves; and
one or more computer systems configured to:
process recorded data associated with the first acoustic waves, the first reflection waves, the second acoustic waves, and the second reflection waves, wherein the first acoustic waves are associated with a first radial direction, and wherein the second acoustic waves are associated with a second radial direction, the second radial direction being opposite to the first radial direction;
determine a first ratio between a parameter associated with the first reflection waves and a parameter associated with the first acoustic waves;
determine a second ratio between a parameter associated with the second acoustic waves and a parameter associated with the second reflection waves; and
generate a plot for identification of one or more isolation regions in the wellbore based on the processing, wherein the one or more isolation regions are identified based on the first ratio and the second ratio.

15. The system of claim 14, further comprising a plurality of staves disposed about an axis of the radial acoustic sensor.

16. The system of claim 15, wherein the plurality of staves spaced from each other by an angle.

17. The system of claim 15, wherein the first acoustic waves are transmitted and received via the plurality of staves.

18. The system of claim 14, wherein the one or more isolation regions are determined by dividing the first ratio and the second ratio to generate the plot.

* * * * *